United States Patent [19]
Solis et al.

[11] Patent Number: 5,788,728
[45] Date of Patent: Aug. 4, 1998

[54] POWDER COATING BOOTH WITH IMPROVED CYCLONE SEPARATOR

[75] Inventors: Christopher M. Solis, Elyria; Michael A. Reighard, Avon Lake; Peter G. Lambert, Chagrin Falls; Christopher H. Chandler, North Ridgeville; Donald L. Urig, Elyria, all of Ohio; Robert L. Gielow, Farmington Hills, Mich.

[73] Assignee: Nordson Corporation, Westlake, Ohio

[21] Appl. No.: 759,884

[22] Filed: Dec. 3, 1996

[51] Int. Cl.$^6$ ............................................. B05B 15/12
[52] U.S. Cl. ................................. 55/422; 55/321; 55/324; 55/337; 55/416
[58] Field of Search ........................... 55/318, 320, 321, 55/324, 328, 330, 331, 337, 352, 416, 422, 458, 271; 98/75

[56] References Cited

U.S. PATENT DOCUMENTS

| | | |
|---|---|---|
| 602,964 | 4/1898 | Van Gelder. |
| 1,797,812 | 3/1931 | Waring. |
| 2,390,841 | 12/1945 | Longden. |
| 2,790,554 | 4/1957 | Work. |
| 3,061,098 | 10/1962 | Brezinski. |
| 3,197,955 | 8/1965 | Cohen et al.. |
| 3,246,454 | 4/1966 | Norton. |
| 3,362,140 | 1/1968 | Mott. |
| 3,513,642 | 5/1970 | Cornett. |
| 3,558,484 | 1/1971 | Carr. |
| 3,618,302 | 11/1971 | Cornett. |
| 3,768,172 | 10/1973 | Klein et al.. |

(List continued on next page.)

FOREIGN PATENT DOCUMENTS

| | | |
|---|---|---|
| 652152 | 12/1964 | Belgium. |
| 0087778 | 9/1983 | European Pat. Off.. |
| 0214901 | 3/1987 | European Pat. Off.. |
| 0223660 | 5/1987 | European Pat. Off.. |
| 2558780 | 4/1987 | France. |
| 2675061 | 10/1992 | France. |
| 2724583 | 5/1995 | France. |
| 1907709 | 9/1970 | Germany. |
| 2839540 | 3/1980 | Germany. |
| 3842000 | 6/1990 | Germany. |
| 4212270 | 10/1993 | Germany. |
| 4232382 | 3/1994 | Germany. |
| 9000646 | 1/1990 | WIPO. |
| 9510365 | 4/1995 | WIPO. |

OTHER PUBLICATIONS

"Separation of Particles from Air and Gases", vol. II: Morphological Analysis, by Akira Ogawa, Dr. Eng., CRC Press, Inc., Boca Raton, Florida, 1984.

"Industrial Gas Cleaning" by F.A.L. Dullien, Department of Chemical Engineering, University of Waterloo (Ontario, Canada), Academic Press, Inc., 1989.

Primary Examiner—Jay H. Woo
Assistant Examiner—Minh-Chau T. Pham
Attorney, Agent, or Firm—Calfee, Halter & Griswold LLP

[57] ABSTRACT

Apparatus and process for extracting powder from a stream of powder laden air drawn from a manual powder spray booth in a first embodiment, with a cyclone recovery system, typically containing two cyclone separators for separating the powder from the air. The cyclone separators have a breakaway design to facilitate cleaning. The resulting cyclone cleaned air is drawn through a prefilter section by a fan section having serially stacked fans. The prefilter section further separates powder from the cyclone cleaned air. The resulting prefilter cleaned air is next filtered in a final filter section and exhausted to the air surrounding the cyclone recovery system. The invention also relates to an improved cyclone separator which incorporates a perforated thimble between the downwardly and upwardly moving vortexes in the cyclone separator to reduce the pressure drop across the cyclone separator. In a second embodiment, a stream of powder laden air is drawn from an automatic powder spray booth with a cyclone recovery system typically incorporating horizontally disposed cyclone separators, each with a perforated thimble, a filter module with cartridge filters, a fan module, and a final filter.

42 Claims, 15 Drawing Sheets

U.S. PATENT DOCUMENTS

| | | |
|---|---|---|
| 3,768,302 | 10/1973 | Barringer . |
| 3,917,473 | 11/1975 | Fournie . |
| 4,498,913 | 2/1985 | Tank et al. ......................... 55/DIG. 46 |
| 4,504,292 | 3/1985 | Vohringer . |
| 4,572,756 | 2/1986 | Van Abbema . |
| 4,648,312 | 3/1987 | Schad ........................................... 98/75 |
| 4,723,505 | 2/1988 | Wilson et al. ........................ 55/341.7 |
| 4,797,038 | 1/1989 | Correard . |
| 5,107,756 | 4/1992 | Diaz . |
| 5,123,945 | 6/1992 | Lin ............................................. 55/395 |

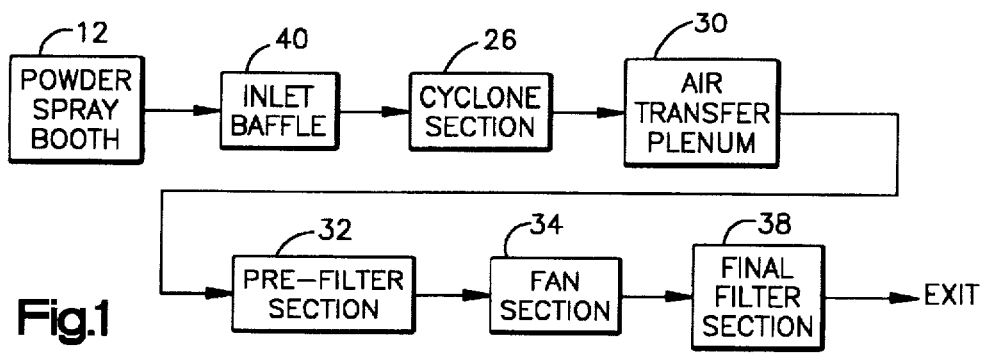
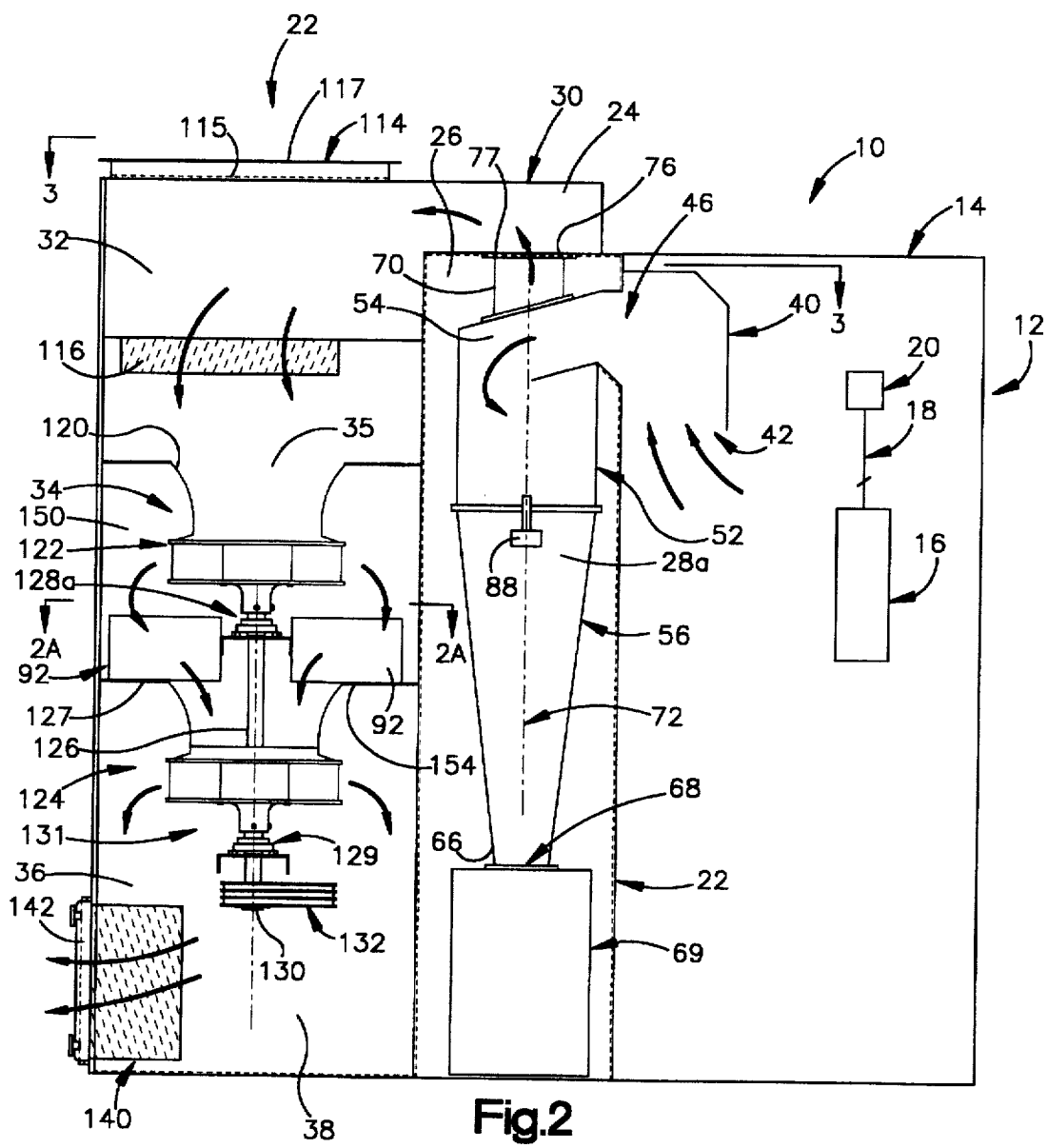

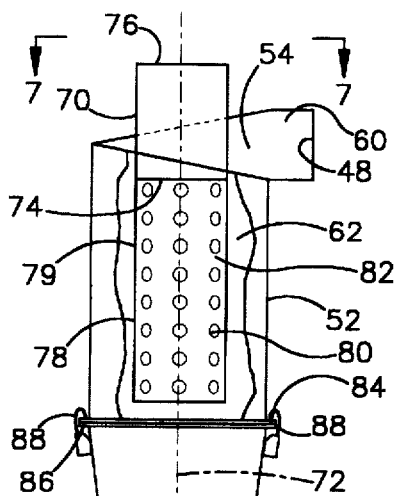
Fig.6
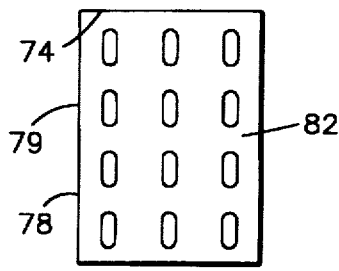
Fig.6A
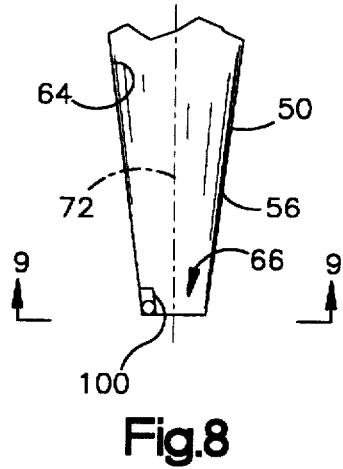
Fig.8
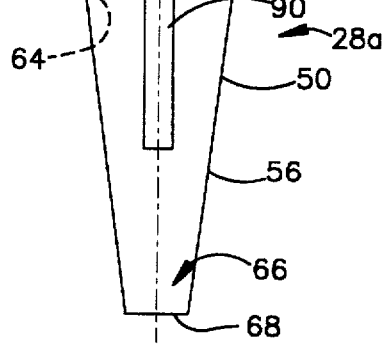
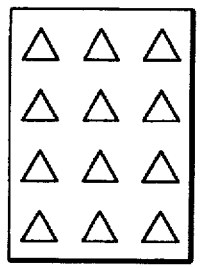
Fig.6B
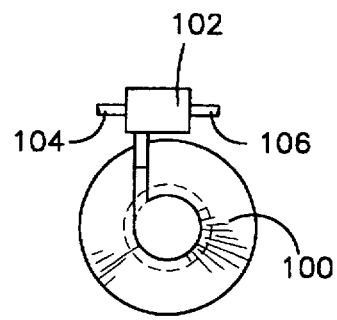
Fig.9
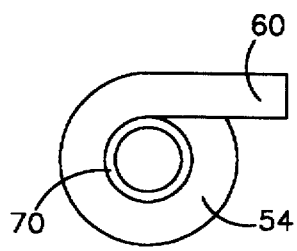
Fig.7
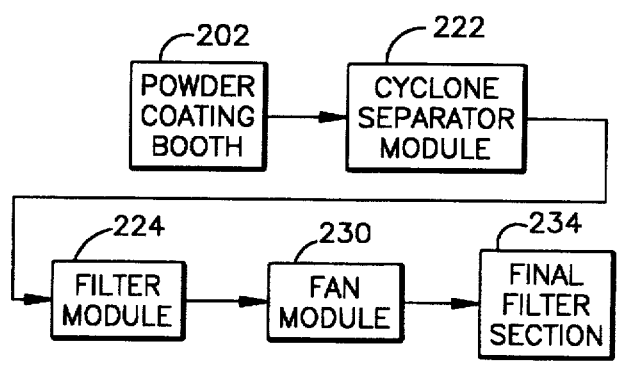
Fig.10

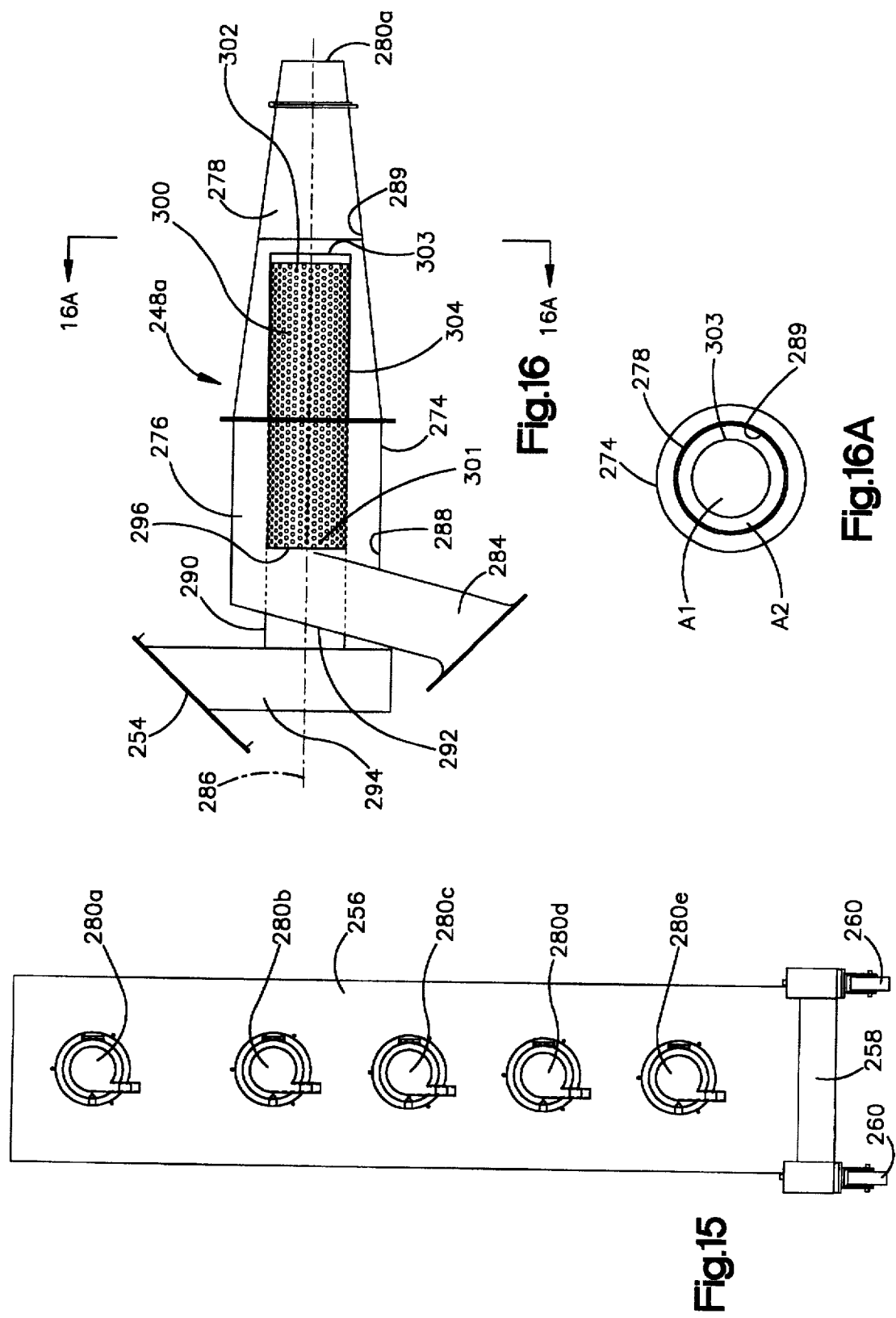

POWDER COATING BOOTH WITH IMPROVED CYCLONE SEPARATOR

FIELD OF THE INVENTION

This invention relates to the field of recovering oversprayed powder from a powder coating booth in which powder coating materials are electrostatically applied to articles being painted. More particularly, the invention relates to an improved process and system for directing oversprayed powder laden air, from a powder coating booth to a powder recovery system, which improves the efficiency of powder separation while reducing the cost of the system's production and installation. The improved process and system is specifically designed to reduce the chance of a deflagration, typically caused by the ignition of the powder/air mixture in the powder coating booth, spreading through the powder recovery system.

BACKGROUND OF THE INVENTION

A powder coating installation, in particular of the electrostatic type, generally includes a coating booth through which the objects or work pieces to be powder coated are passed while being sprayed with electrostatically charged powder. Once covered with a layer of powder, the objects are placed into an oven where the powder is melted and hardened into a homogeneous and durable coating. Powder coating processes have certain advantages over liquid paint spraying processes. These include the elimination of solvent fumes in the vicinity of the powder coating installation and the recovery and recycling of the oversprayed powder which is not deposited on the objects. A stream of air laden with oversprayed powder can be removed from the coating booth by powder collection systems which incorporate various devices to collect the excess powder and to clean and exhaust the air. These devices typically include cartridge filter units and/or cyclone separators. A typical cyclone separator is constructed of an enclosure with a cylindrical and/or a frustoconical wall into which air laden with powder is fed tangentially to create a whirlwind like effect within the cyclone. Because of the centrifugal force generated on the powder, it moves outwardly into contact with the interior side of the outer wall of the cyclone. Cyclones are normally oriented vertically and once the powder particles hit the wall, they generally fall to the bottom of the cyclone. Concurrently, the cleaned air from which the powder has been substantially removed is exhausted out of the top of the cyclone through an axial conduit extending a short distance into the cyclone enclosure.

Cyclone separators have an advantage over some filter units, such as cartridge filter units because excess powder deposited on the interior of the cyclone separator can be more easily removed, thus making cleaning of cyclone separators quick and relatively inexpensive. On the other hand, the amount of powder separated from the air and collected with cyclone separators is less than the amount possible with cartridge filter units, especially when separating fine-grain powder. Moreover, for finer powders, the air exhausted from the cyclone separator must undergo more extensive, additional filtering in a subsequent filter device to remove enough powder so that essentially clean air can be exhausted to the atmosphere surrounding the cyclone separator.

As disclosed in U.S. Pat. No. 4,504,292, the prior art does disclose the concept of connecting a battery of cyclone separators with a filter unit. However, a common problem with this prior art design is that in many handgun or manual spray applications, powder reclamation is not cost effective. This is because with smaller systems, it is too expensive to use large cyclone systems by themselves or in conjunction with filters on which a large amount of powder is accumulated. Also, in the prior art cyclone designs, the need to develop a high pressure across the cyclone separator for effective separation of the powder from the air caused a very high, unacceptable sound level. Also, prior art cyclone designs required the use of a large floor space in the factory.

Another deficiency of the prior art cyclone separators is that because of a large diameter of the cyclone separators, the latter were able to only recover about 80% of the powder carried in the powder laden air which was exhausted as overspray from the powder spray booth. Since the cyclone separators did not recover a high enough percentage of the powder, filters located downstream from the cyclone separator sometimes become too quickly loaded with powder.

Another important problem relating to the use of a collector in combination with a cyclone separator is the need to meet fire protection standards which have evolved because of the possibility of a fire in the coating booth which could spread to the cyclone and then to the collector.

OBJECTS AND SUMMARY OF THE INVENTION

It is an object of the present invention to recycle oversprayed powder collected from a powder spray booth with an improved cyclone recovery system incorporating one or more cyclone separators to obviate the problems and limitations of the prior art systems.

Another object of the present invention is to provide a cyclone recovery system wherein two serially connected fans pull oversprayed powder laden air through the cyclone recovery system.

It is a further object of the present invention to provide an improved cyclone separator with a perforated thimble extending down through the cyclone separator to establish the location of the boundary between an outer vortex of powder laden air spiraling in a first direction through the cyclone separator and an inner vortex of cyclone cleaned air spiraling in a second opposite direction through said cyclone separator.

It is a yet further object of the present invention to provide an improved cyclone separator with a perforated thimble extending down through the cyclone separator to reduce the pressure differential across the cyclone separator by the placement and number of openings through the thimble while maintaining powder separation efficiency.

It is a still further object of the present invention to provide an improved cyclone separator constructed of two sections which easily and quickly separate to provide access to the interior of the cyclone separator to facilitate cleaning.

Yet another object of the present invention is to provide an improved cyclone recovery system incorporating a cyclone separator module which draws powder laden air from a coating booth and directs cyclone cleaned air to a filter module and a fan module for further separation of remaining powder from the cyclone cleaned air.

In accordance with the invention, there is provided a cyclone recovery system, typically containing one or more cyclone separators for extracting powder from a stream of powder laden air withdrawn from a powder spray booth. The cyclone separators separate the powder from the air and direct the cyclone cleaned air through an air transfer plenum to a prefilter section for further separating powder remaining in the cyclone cleaned air. The prefilter cleaned air is next drawn through a fan section having two serial fan assemblies driven by a common shaft and exhausted to a final filter section for separating any remaining powder from the prefilter cleaned air. The final filter cleaned air is then exhausted, typically into the room housing the powder spray booth and the cyclone recovery system.

Also, in accordance with the invention, the fan assemblies are constructed with air foil-type wheels mounted in series on a common shaft to reduce the sound level of the cyclone recovery system.

Further in accordance with the invention, each of the cyclone separators is constructed of a cyclone separator housing having an upper substantially cylindrical portions and a lower, frustoconical converging portion terminating in a powder outlet. A tubular member is concentrically disposed within the upper cylindrical portion of the housing and extends upwardly through the cyclone housing cover to provide a cyclone air outlet. An elongated thimble, typically with a plurality of perforations therethrough, is mounted to the tubular member so as to extend downward within the cyclone housing toward the lower frustoconical converging portion. In the embodiment where the perforated thimble has perforations, the openings can be of a desired shape and function to reduce the pressure drop across the cyclone separator.

According to a second embodiment of the invention, the cyclone powder outlet is tangential to an axis extending through the lower frustoconical converging portion and has a pump connected thereto to exhaust the powder to a sieve and hopper.

Further, in accordance with the invention, a second embodiment of a cyclone recovery system is used in conjunction with a powder spray booth where work pieces are sprayed automatically and the powder overspray is withdrawn as powder laded air to a cyclone separator module incorporating a number of cyclone separators, each in a horizontal position, which separate powder from the powder laden air. The cyclone cleaned air is then directed through a filter module where more of the powder remaining in the air is separated and the filter cleaned air is drawn through a fan module and directed across a final filter into the atmosphere surrounding the coating booth.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 1 is a block diagram of a cyclone recovery system being used in conjunction with a powder spray booth, in accordance with the invention;

FIG. 2 is a side view of a cyclone recovery system incorporating a cyclone separator section, and prefilter and final filter sections with an intermediate fan section;

FIG. 6 is a side view of a cyclone separator with a cutaway section showing a perforated thimble;

FIG. 6A is an enlarged side view of the portion of the perforated thimble showing oval perforations;

FIG. 6B is an enlarged side view of the portion of the perforated thimble showing triangular perforations;

FIG. 7 is a plan view taken along line 7—7 of FIG. 6;

FIG. 8 is a side view of a second embodiment of a cyclone separator with a tangential powder outlet;

FIG. 9 is a bottom view of a cyclone separator taken along line 9—9 of FIG. 8.

FIG. 10 is a block diagram of a cyclone recovery system used in conjunction with an automatic spray booth, in accordance with the invention;

FIG. 15 is an end view of the cyclone separator module taken along line 15—15 of FIG. 13;

FIG. 16 is a side view of a cyclone separator of the type incorporated in the cyclone separator module of FIG. 13;

FIG. 16A is a view through line 16A—16A of FIG. 16;

DETAILED DESCRIPTION OF THE INVENTION

Figure 2A:
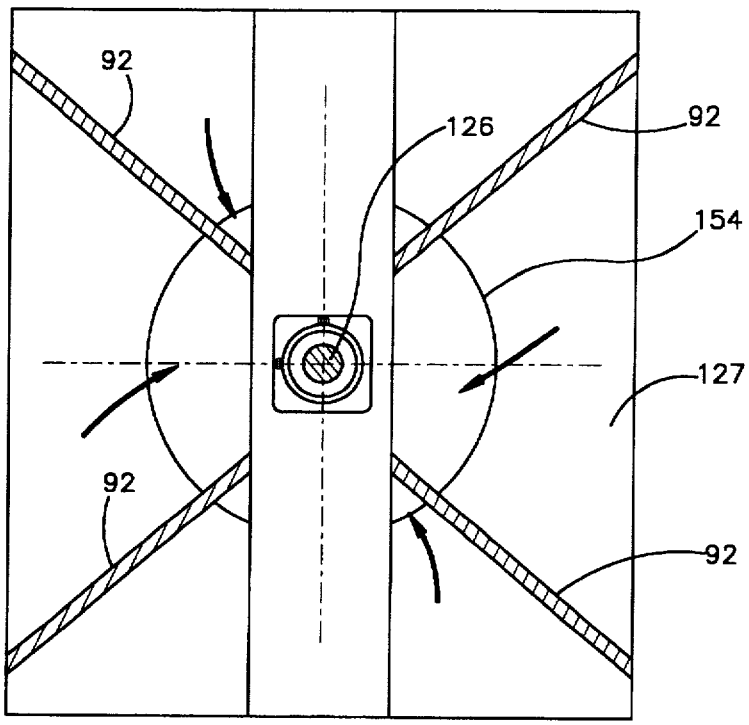
FIG. 2A is a cross sectional view taken along line 2A—2A of FIG. 2 showing the guide vanes.

Referring to FIGS. 2,3,4, and 5, a cyclone recovery system 10, intended for use with a powder coating booth 12 for manually coating articles 16 with powder coating material by an operator using a handgun (not shown), includes provision for automatic recovery and recirculation of the oversprayed powder in the system. The powder coating booth 12 is of a generally conventional design and includes a canopy 14 in which the article or workpiece 16 to be coated can be located. Typically in such equipment, one or more articles or workpieces 16 to be coated are supported on a conventional fixture or hook 18 extending down from a stationary rack or conveyor system 20 which moves the workpiece through the powder coating booth 12. While powder coating booth 12 is typically for manually coating articles 16, it is also within the terms of the invention to automatically spray articles 16 within the booth.

A cyclone recovery system 10 (see FIGS. 2, 3, 4) is installed against the side wall of the coating booth 12. It includes a collector 22 which is constructed of a collector housing 24 that includes a cyclone separator section 26 which houses one or more cyclone separators 28a and 28b. Collector housing 24 also includes an air transfer plenum section 30 with passages 31a, 31b (See FIGS. 3 and 4) interconnecting cyclone separators 28a and 28b, respectively, in cyclone section 26 with a prefilter section 32. A fan section 34, disposed below and downstream from prefilter section 32, has a fan inlet 35 and is in flow communication therewith. The fan outlet 36 of fan section 34 opens into a final filter section 38 which in turn exhausts the cleaned air to the atmosphere surrounding collector 22.

Figure 3:
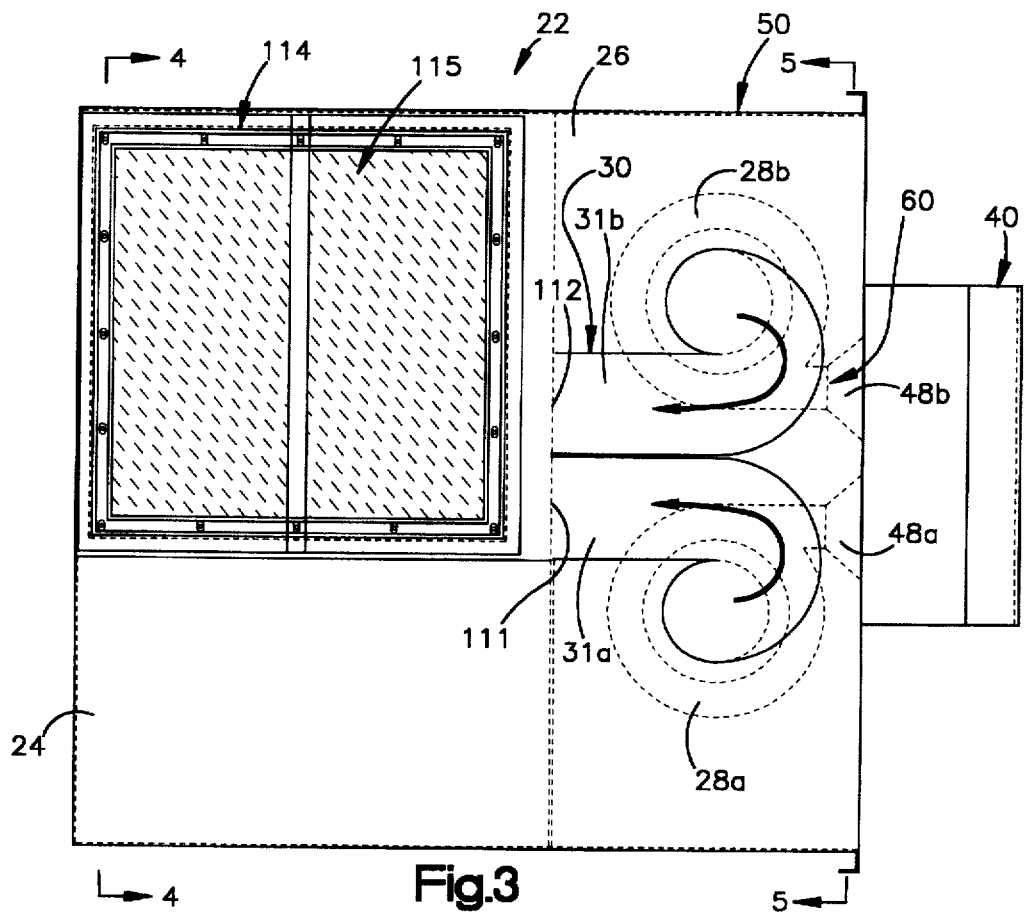
FIG. 3 is a plan view of the cyclone recovery system taken along line 3—3 of FIG. 2.

Each of the substantially identical cyclone separators 28a and 28b are in flow communication with an inlet baffle 40 located within canopy 14 (see FIG. 2). Inlet baffle 40 has an inlet opening 42 into which a stream of powder laden air containing the oversprayed powder from the coating of workpiece 16 is drawn in and then directed through baffle outlet opening 46 to inlet openings 48a and 48b of the cyclone separators 28a,28b to which it is mounted. For purposes of description, only cyclone separator 28a is described since the only significant difference between cyclone separators 28a and 28b is that the vortex of the stream of air laden powder moves through them in counter directions (see the air flow arrows in FIG. 3). While cyclone section 26 is shown in FIG. 3 with two cyclone separators 28a, 28b, it is within the terms of the invention to incorporate more or less cyclone separators in accordance with the system requirements.

Cyclone Separator

Figure 5:
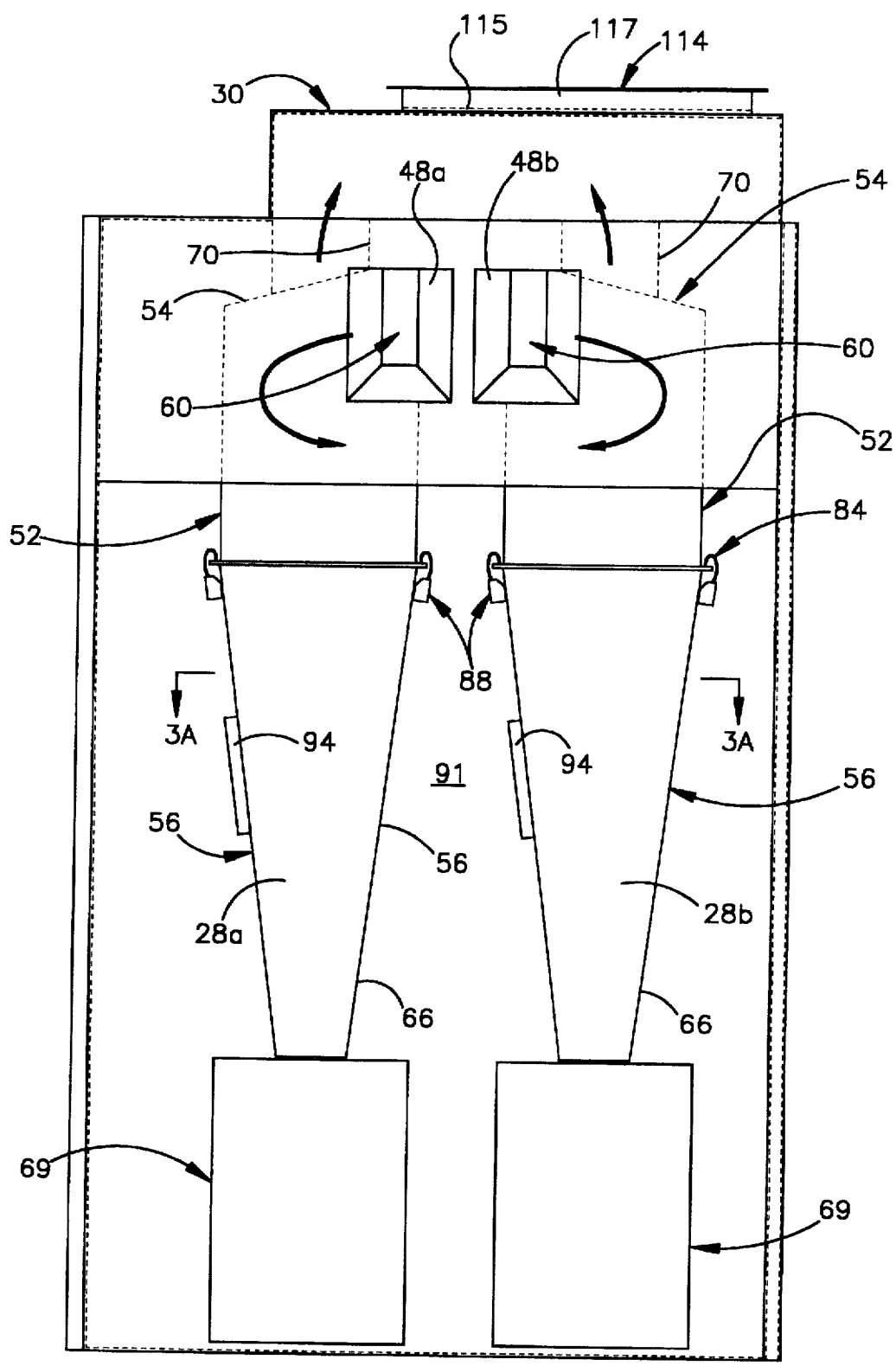
FIG. 5 is a side view taken along line 5—5 of the cyclone recovery system illustrated in FIG. 3.

Cyclone separator 28a (see FIG. 6) is constructed of a cyclone separator housing 50 having an upper cylindrical portion 52 provided with a cyclone housing cover 54 and a lower frustoconical converging portion 56 terminating in a reduced end portion 66. A cyclone separator inlet 60 is disposed in tangential relation to the cylindrical portion 52 so that the stream of powder laden air enters the cyclone housing 50 through inlet opening 48 of inlet 60 tangentially with respect to a longitudinal axis 72 extending through housing cover 50. The cyclone separator housing 50 has a helical shaped cyclone housing cover 54 (see FIG. 7) which assists the stream of powder laden air in moving in a spiral downward path along the inner surface 62 of the upper cylindrical portion 52 and the inner surface 64 of the frustoconical converging portion 56. The reduced end portion 66 of converging portion 56 has a powder outlet 68 through which powder that was separated from the stream of powder laden air introduced into cyclone separator 28a flows into a powder hopper 69 as shown in FIGS. 2 and 5. A tubular air outlet member 70 is concentrically disposed about longitudinal axis 72 through cyclone separator housing 50 and extends upwardly through cyclone housing cover 54 to form an air outlet 77 through which cyclone cleaned air exits cyclone separator 28a into passageway 31a of air transfer plenum 30. Tubular member 70 has one end 74 which terminates in upper cylindrical portion 52 and a second opposite outlet end 76 terminating as cyclone air outlet 77 of cyclone 28a.

A principle feature of the present invention relates to the provision of a tubular insert or perforated thimble 78 which has a plurality of perforations or apertures 80 through the cylindrical wall 82 forming thimble 78. Thimble 78 is securely mounted, by conventional means such as bolting or welding, at its upper or clean air outlet end to end 74 of tubular member 70 so that its lower or clean air inlet end 73 extends within separator housing 50 towards the frustoconical portion 56. Alternatively, tubular member 70 and thimble 78 can be constructed as a single unitary member.

Thimble 78 functions to establish and stabilize the location of the boundary between the outer vortex of powder laden air spiraling downward between the inner surface 62 of the separator housing 50 and the outer surface 79 of thimble 78 and the inner vortex of cyclone cleaned air moving upward through thimble 78. Without the thimble, the interface between the inner and outer vortexes fluctuates and causes an increase of the differential pressure across the cyclone. This results in a reduction of the operating efficiency of the cyclone separator. The provision of thimble 78 separates and stabilizes the boundary or interface between the inner and outer vortexes and thereby increases the efficiency of the cyclone separator. In the preferred embodiment, thimble 78 has a plurality of perforations 80 through its wall 82 which are sized to allow for transfer of air into thimble 78 from the outer vortex of powder laden air spiraling downward from inlet 60 and the inner vortex of cyclone cleaned air moving upwards along the axis of cyclone 28a rotating in the same direction as the outer vortex and exiting through thimble 78 and outlet end 76 of tubular member 70. The inner and outer surfaces 81 and 79, respectively, are relatively smooth so that the inner and outer vortexes flow across the walls without increased turbulence and a resulting increased pressure drop.

The perforations or holes 80 include circular, oval, and triangular shaped openings, as seen in FIGS. 6, 6A and 6B, and are sized to allow for air transfer between the downward flowing outer vortex of powder laden air and the upward flowing inner vortex of cleaned air to reduce friction and energy loss, and ultimately, to reduce the pressure drop across the cyclone separator. By reducing the pressure drop across cyclone 28a, a smaller sized fan can be used to draw powder laden air into the cyclone. A smaller fan is less expensive to operate and does not make as much noise as a larger fan. Preferably, about 40 to about 60 percent of the wall 82 of thimble 78 is perforated and most preferably, about 45 to about 55 percent of the wall 82 of thimble 78 is perforated. The size of the perforations are about 0.25 to about 1.0 inches and typically about 0.5 inches in diameter to enable the transfer of air between the inner and outer vortexes.

Figure 3A:
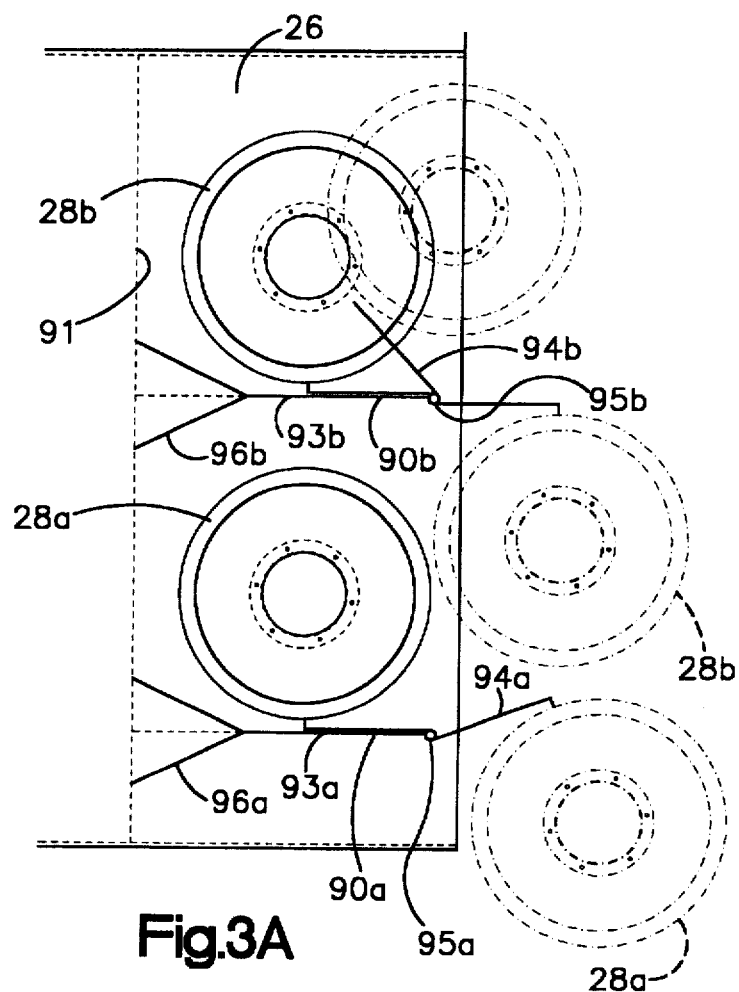
FIG. 3A is a view taken along line 3A—3A of FIG. 5 showing the cyclone separators in phantom in position for cleaning.

As shown in FIG. 6, the upper cylindrical portion 52 of cyclone separator housing 50 has a seal ring 84 about its lower end which abuts against a seal ring 86 which extends about the upper end of frustoconical converging portion 56. The seal rings 84,86 are removably secured to each other by conventional means such as overcenter clamps 88 or bolts and can have a seal element (not shown) therebetween. The frustoconically converging portion 56 is mounted by a pivot arm assembly 90a, 90b (see FIG. 3A) to an inner wall of cyclone section 26. Only pivot arm assembly 90a is discussed since pivot arm assemblies 90a and 90b are substantially identical. Pivot arm assembly 90a has a wall mount 96a attached to wall 91 with a fixed arm 93a extending therefrom. A pivot arm 94a is secured at one end of converging portion 56 and at the opposite end to a pivot point 95a about which arm 94a pivots with respect to fixed arm 93a.

To clean cyclone separators 28a, 28b, the clamps 88 are released and the frustoconically converging portions 56 are pivoted on arms 94a,94b about fixed arms 93a, 93b, respectively, to a location out of alignment with cylindrical portions 52 (see FIG. 3A) of cyclone separators 28a, 28b so that an operator can reach up into cylindrical portion 52 and clean the inner surface 62 as well as tubular member 70 and thimble 78. At the same time, frustoconical portion 56 of either or both cyclone separators 28a, 28b can also be cleaned. After cleaning, the frustoconical converging portions 56 can be quickly and easily pivoted back into alignment with cylindrical portions 52 and secured in place with clamps 88. The system can now be switched to coating with another powder color without fear of cross contamination between colors.

While reduced outlet 68 of frustoconical converging portion 56 is shown in FIGS. 2 and 5 as being positioned to direct the powder separated from the stream of powder laden air within the cyclone separators 28a, 28b into collection hoppers 69, it is also within the terms of the invention to provide a second embodiment where the reduced end portion 66 is closed, as shown in FIGS. 8 and 9. In this embodiment, a tangential outlet 100 is provided with a pump 102, such as a transfer pump, Part No. 165633A from Nordson Corp. of Amherst, Ohio mounted thereto. Pump 102 has a compressed air inlet 104 to transfer the powder to a conduit 106 which is connected to a standard sieve and feed hopper arrangement (not shown). The advantage of this embodiment is to eliminate the need for an intermediate hopper below the cyclone because the powder can be immediately transported from pump 102 to the feed hopper. In addition, the provision of the tangential outlet 100 for the discharge of recovered powder permits the cyclones to be laid horizontally. Another important advantage of this arrangement is that the powder is constantly being withdrawn out of the cyclone so that the risk of fire in the cyclone is reduced.

Air Transfer Plenum

The outlet 76 of tubular member 70 is connected to a passageway 31a or 31b of air transfer plenum 30, as shown in FIG. 3. Air transfer plenum 30 has outlet openings 111,112 (see FIG. 4) into prefilter section 32. An explosion vent 114 is provided in the collector housing 24 on the outward facing surface of air transfer plenum 30 to serve as a safety outlet to vent any possible explosions, caused by powder igniting, into an unoccupied space above collector 22. The explosion vent 114 is constructed with a wire mesh 115 covered by a burstable, mylar membrane 117.

Prefilter Section

The prefilter section 32 (see FIGS. 2 and 4) can house one or more prefilter elements 116 which are relatively inexpensive filters constructed of a large mesh material (larger mesh than the final filter) that can be easily replaced and thrown away. The prefilter elements 116 can easily be accessed for replacement through a prefilter access door (not shown) that is secured to the collector housing 24 by any conventional means such as clamps. The prefilters 116 function to filter out the majority of powder in the cyclone cleaned air which is being drawn through the fan section 34. One advantage of prefiltering is to prevent the buildup of powder on the fan assemblies 122 and 124 which can cause fan imbalance, leading to excessive noise and fan malfunction. The prefilter section 32 has an outlet 120 which opens into fan section 34. A second advantage of prefiltering is that the removal of the majority of powder prior to final filters 140 is the life extension of the relatively more expensive final filters 140. This lowers the net system operational costs.

Fan Section

Figure 4:
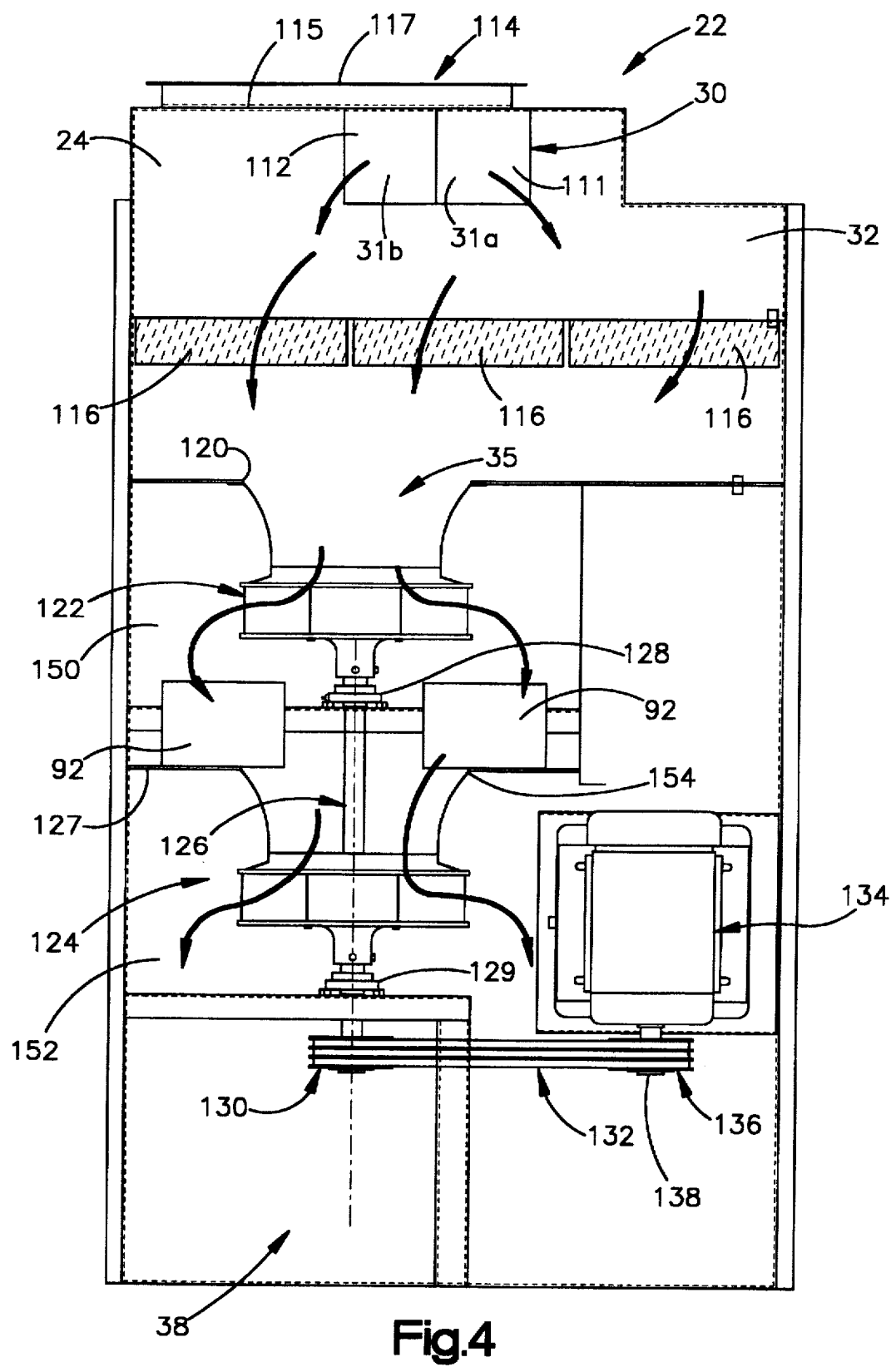
FIG. 4 is a side view taken along line 4—4 of the cyclone recovery system illustrated in FIG. 3.

Fan section 34 has two fan assemblies 122 and 124 which are mounted in series on a single shaft 126 that is rotatably secured in bearing sleeves 128 and 129 (see FIG. 4). One end of shaft 126 has a pulley 130 secured thereto. A drive belt 132 is disposed between pulley 130 and a pulley 136, which in turn, is secured to a drive shaft 138 of a motor 134, such as a conventional electric motor. The fan assemblies 122, 124, are constructed of quiet, air foil-type wheels (not shown) and are placed in series to reduce the noise level of the fan assemblies while still attaining the pressure differential across the cyclone separators needed for efficient system operation. Also, by serially stacking the fan assemblies 122, 124, the collector 22 can be constructed in a small, compact size. One acceptable type of foil wheel that can be used is a Model SAFK wheel manufactured by Chicago Blower of Glendale Heights, Ill.

An important structural feature incorporated in the fan assemblies 122, 124, is the incorporation of fan inlet guide vanes 92 (see FIG. 2A) which straighten the air flow from the first fan assembly 122 into the second fan assembly 124. The fan guide vanes 92 are disposed in radial orientation about shaft 126 and are seated against a plate 127 dividing fan section 34 into an upper portion 150 containing first fan assembly 122 and a lower portion 152 containing second fan assembly 124. The inlet of fan assembly 124 is mounted to a circular opening 154 through plate 127. Preferably four (4) fan inlet guide vanes 92 are used. However, it is within the terms of the invention to use between two guide vanes and ten or more guide vanes as required. The inlet guide vanes 92 straighten the airflow from the first fan assembly 122 into the second fan assembly 124 to improve the efficiency of system 10. All of the air is directed straight into the second fan increasing the work that the second fan can do to the air flow, which in turn, increases the overall suction force of the fan assemblies 122,124 on the cyclone separators 28a, 28b.

Final Filter Section

The prefiltered air being exhausted from the fan assemblies 122 and 124 of fan section 32 flows through fan section outlet 131 into the final filter section 38 (see FIG. 2) which contains one or more final filter elements 140. The final filter elements 140 are mounted to be quickly and easily removed and replaced in final filter section 38. Access to the final filters elements 140 is by removing filter clamping frame 142 (see FIGS. 2 and 4) which is constructed of wire mesh and is secured to the collector housing 24 by conventional means such as thumbscrews.

Operation of First Embodiment

The overall operation of system 10 is shown in FIG. 1. Oversprayed powder is removed from powder coating booth 12 as a stream of powder laden air through the inlet baffle 40 and directed into the cyclone separator section 26 where the powder is separated from the cyclone cleaned air. The powder is collected in a hopper 69 and the cyclone cleaned air then flows through an air transfer plenum 30 into a prefilter section 32 where more of the remaining powder is removed. The prefiltered air is then drawn through a fan section 34 and across a final filter section 38. The final filtered air is exhausted from system 10 into the air surrounding the system. A more detailed description of the system operation, including alternative embodiments follows.

The oversprayed powder in spray booth 12 is drawn as a stream of powder laden air into collector 22 through the inlet baffle 40. For purpose of explanation, only two cyclone separators 28a and 28b are described, however any number of cyclone separators can be incorporated in system 10. The powder laden air drawn through the inlet baffle 40 enters the cyclone separators 28a,28b through the cyclone inlets 60. The cyclone separators 28a,28b separate the majority of powder from the powder laden air and the separated powder is collected in the hoppers 69. Two or more cyclone separators 28a,28b are used because they are more efficient and compact than a single, larger diameter cyclone separator. The cyclone cleaned air from the cyclone separators 28a,28b flows through the air transfer plenum 30 and into the pre-filter section 32. The cyclone cleaned air, still containing some powder that was not separated by the cyclone separators 28a,28b, flows through relatively large mesh, prefilters 116 before entering the fan section 34. The prefilters 116, which are relatively inexpensive as compared with final filters 140, 142, separate the majority of the remaining powder from the cyclone cleaned air to limit the amount of powder particles that flow with the prefilter cleaned air through the fan assemblies 122 and 124. The prefilters 116 extend the life of the more expensive, high efficiency final filters 140,142 and prevent powder build up on fan assemblies 122,124. The prefilter, cleaned air is drawn through the two serially arranged fan assemblies 122 and 124 that are driven from a motor driven common shaft 126. Placing the fan assemblies 122 and 124 in series creates sufficient suction to operate the cyclone separators 28a,28b while lowering the noise, through the use of relatively quiet air foil type wheels, to an acceptable level. The prefilter cleaned air flows from the downstream fan assembly 124 into the final filter section 38. The remaining powder in the prefilter cleaned air is separated by a high efficiency final filter 140 and the final filter cleaned air is typically exhausted into the room in which the cyclone recovery system 10 is located.

Second Embodiment

Referring to FIGS. 10–21, another embodiment of the invention relates to a powder recovery system 200 (see FIG. 11) intended for use with a large scale powder coating booth 202 for automatically coating powder coating material to articles as they are conveyed through the powder coating booth 202. The booth 202 is of a generally conventional design and includes a powder booth canopy 204 through which the article or workpiece to be coated is conveyed. Powder booth canopy 204 includes an inlet section 206, an outlet section 208 and a longitudinally extending slot 210 to receive a rack or hook 212 that is secured to a conveyor 214 to carry a workpiece 216. The workpiece 216 is transported by the conveyor 214 from the inlet section 206, past automatic spray gun sections 218 and 220 and out of the outlet section 208. The spray guns located within spray guns section 218 and 220 are connected to a source of air entrained powder, such as a powder feed hopper and powder pump (not shown) to spray electrostatically charged powder onto the electrically grounded articles 216 carried by the conveyor 214 through the powder coating booth 202.

The powder recovery system 200 includes a cyclone separator module 222 which is located to one side of a powder coating booth 202 and downstream from the spray gun sections 218, 220. Cyclone module 222 is connected to a fan (later described) to draw a stream of powder laden air from the powder booth canopy 204. The powder is the oversprayed powder which did not adhere to the workpieces 216 as they were sprayed during their movement through the powder coating booth 202. Cyclone module 222 removes most of the powder from the powder laden air and the cyclone cleaned air, that is exhausted from cyclone module 222, is drawn through a filter module 224 in which a plurality of stacked upper and lower filter cartridges 226a, 226b (See FIG. 12) are disposed for removing powder contained in the cyclone cleaned air and exhausting filter cleaned air into an air transfer plenum 228 through which the air is drawn by a fan module 230. The fan module 230 has two serially connected fan assemblies 232 and 233 which draw the powder laden air from the powder coating booth 202, through the cyclone separator module 222 into the filter module 224, across the air transfer plenum 228, and finally through a final filter section 234 for discharge as cleaned air into the atmosphere surrounding the powder coating booth 202.

Cyclone Separator Module

Referring now to the cyclone separator module 222 (see FIGS. 13–15), module 222 is wheeled and has a rear or powder inlet section 240 with a wall 244 abutted against and secured to powder booth canopy 204 so that air laden powder inlets 246a, 246b, 246c, 246d, and 246e (246a–246e) of cyclone separators 248a, 248b, 248c, 248d, and 248e (248a–248e) are aligned with a plurality of exhaust openings (not shown) in a side wall 250 of powder booth canopy 204. A side wall 252 of rear section 240 has a plurality of air exhaust openings 254 which direct cyclone cleaned air into filter module 224 as discussed in more detail below. Cyclone separator module 222 also has a powder outlet or forward section 256 which is supported on a support base 258 with wheels 260. The forward section 256 is detachably secured to the rear section 240 by a plurality of overcenter clamps 262 and 264 located along the sidewalls 266 and 268 of forward section 256 to clamp onto the forward extending side walls 270 and 272 of the rear section 240. As discussed in more detail below, the forward section 256 can be rolled away from the rear section 240 to enable an operator to easily and quickly clean the cyclone separators 248a–248e of any retained powder coating material as required. Then, the forward section 256 can simply be rolled back to again abut the rear section 240 and be clamped and secured thereto by overcenter clamps 262 and 264.

Another principle aspect of the invention relates to the construction of the cyclone separators 248a–248e and their location in the separator module 222. First, it is noteworthy that the cyclone separators 248a–248e are disposed in a non-vertical, generally horizontal orientation. This enables the opening of each of the cyclone separators 248a–248e when the forward section 256 is moved away from the rear section 240 as discussed in more detail below. Each of the cyclone separators 248a–248e is substantially identical and therefore, for purposes of explanation, only the uppermost cyclone separator 248a is illustrated in FIG. 16 and discussed herein.

Cyclone separator 248a is constructed in a similar manner to cyclone separators 28a, 28b described herein before and illustrated in FIG. 6. The cyclone separator 248a (see FIGS. 13 and 16) is constructed of a cyclone separator housing 274 having a rear cylindrical portion 276 and a forward frustoconical converging portion 278. The larger end of frustoconical converging portion 278 is secured and sealed to rear cylindrical portion 276 and the smaller end terminates in a closed end 280a. A tangential powder outlet 282a (See FIG. 14) is connected to a pump (not shown) similar to pump 102 as shown in FIG. 9, to transfer the powder accumulating at the closed end 280a of cyclone separator housing 274 to a standard sieve and hopper arrangement (not shown). The pump serves to constantly remove the powder from the cyclone separator so that the powder constantly moves through separator 248a and does not accumulate near the closed end 280a of cyclone separator housing 274.

A cyclone separator inlet 284 is mounted tangentially to cylindrical portion 276 so that the powder laden air enters the cyclone separator housing 274 tangentially with respect to a longitudinal axis 286 extending through the cyclone separator 248a. The cyclone inlet 284 has a helical shape to assist the movement of the stream of powder laden air in a spiral path along the inner surface 288 of the rear cylindrical portion 276 as well as along the inner surface 289 of the frustoconical converging portion 278. A tubular member 290 extends upwardly through the top 292 to form an outlet through which cyclone cleaned air exits cyclone separator housing 274 and then flows into a exhaust channel 294 and through an exhaust opening 254. The cyclone cleaned air is drawn through exhaust opening 254 into filter module 224 as discussed in detail below. Tubular member 290 has one end 296 which terminates in the cylindrical portion 276 and a second opposite outlet end 298 terminating outside of separator housing 274.

A principle feature of the invention relates to the provision of a perforated thimble 300 which has a plurality of perforations or holes 302 through the cylindrical wall 304 forming the perforated thimble 300, as shown in FIG. 16. Thimble 300 is securely mounted, by conventional means such as bolting or welding, at one end 301 to the lower end 296 of tubular member 290 so as to extend downwardly within the cyclone separator housing 274 to within the frustoconical converging portion 278.

An important aspect of the invention relates to positioning the lower end 303 of thimble 300 within the cyclone separator so that the lowest pressure drop across the cyclone separator is achieved. It has been found that the lowest pressure drop is achieved when the lower end 303 of thimble 303 extends into the frustoconical converging portion 278 so that the area $A_1$ at the end 303 of thimble 300 is substantially equal to the area $A_2$ between the thimble 300 and the inner surface 289 and the outer surface of thimble 300, as shown in FIG. 16A. However, it has also been found that satisfactory operation can be achieved when the end 303 is closer to the outlet tube 290 such as at the intersection of the cylindrical portion 276 and the frustoconical converging portion 278.

Thimble 300 operates in a manner similar to thimble 78 of the first embodiment. A plurality of openings 302 through the wall 304 of perforated thimble 300 are sized to allow for contact between the outer vortex of powder laden air spiraling downward from inlet 284 between the inner surface 288 of the cylindrical portion 276 and the outer surface of the thimble 300. An inner vortex of cyclone cleaned air moves upward, in the opposite direction of the outer vortex of powder laden air, through thimble 300 in the same rotational direction as the outer vortex and exhausts through exhaust channel 294 and outlet 254.

The holes 302 are sized to allow for contact between the downward flowing outer vortex of powder laden air and the upper flowing inner vortex of cleaned air and to reduce "friction" and energy loss as the inside of the outer vortex rotates against and at a higher velocity than the outside of the inner vortex. Reducing the friction between the inner and outer vortexes reduces the pressure drop across the cyclone separator 248. Further, a reduced pressure drop permits the use of a smaller fan to effectively draw oversprayed powder from the booth. Preferably, about 40% to about 60% of the wall of the thimble 300 is perforated and, most preferably, about 45% to about 55% of the wall of thimble 300 is perforated. The size of the perforations are selected to properly balance the speed of the inner and outer vortexes and to reduce the friction between the inner and outer vortexes by establishing and keeping the boundary between the inner and outer vortex at a substantially constant location.

The rear cylindrical portion 276 of each cyclone separator 248a–248e is secured within the rear section 240 of module 222 and each of the forward frustoconically converging portions 278 are secured within the forward section 256. Thus, to clean the cyclone separators 248a–248e, the clamps 262 and 264 are released and the forward section 256 is rolled on its wheels 260 away from the rear section 240 so that the frustoconically converging portions 278 are separated from the rear cylindrical portions 276. Then, an operator can easily clean either forward or rear sections 256, 240, respectively, of any accumulated powder. Since the cyclone separators 248a–248e extend outward in a horizontal position, a stack of the cyclone separators can be constructed in the separator module 222. While five cyclone separators 248a–248e are illustrated, it is within the terms of the invention to provide more or less separators as needed. A further advantage of disposing the cyclone separators in a horizontal direction is that the perforated thimble can be longer and extend into the frustoconical portion 278, as opposed to only the length of the cylindrical section as in the first embodiment, while still permitting the cyclone separators to be easily disassembled for cleaning. This is advantageous in that it decreases the pressure drop across the cyclone separator and thereby decreases the power requirements of the fans needed to operate the cyclone separators. As previously discussed, the length of thimble 300 is preferably selected to extend at least to the intersection of frustoconical portion 278 and rear cylindrical portion 276 and preferably to a position where the cross sectional area $A_2$ between the outer surface of the wall 304 of thimble 300 and the inner surface of housing 276 is substantially equal to the cross sectional area $A_1$ across the end 303 of thimble 300. After cleaning, the forward section 256 can be easily rolled back into position against the rear section 240 so that the frustoconical portions 278 are aligned with their corresponding cylindrical portion 276. Then, the clamps 262 and 264 are again secured and the system is ready to apply powder coatings with a new color of powder and without the danger of cross contamination of colors of powder.

Filter Module

Figure 11:
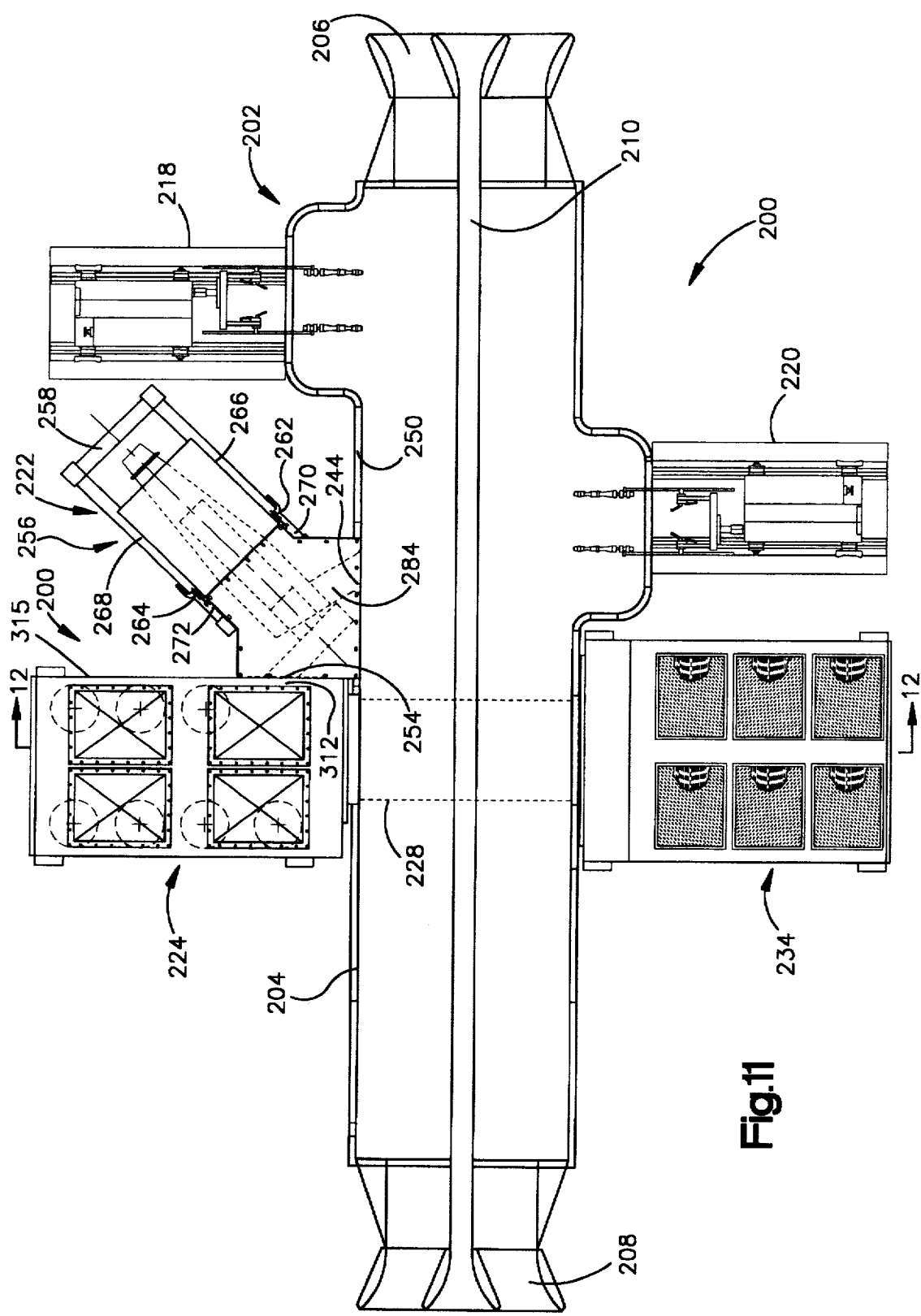
FIG. 11 is a plan view of a cyclone recovery system attached to a powder spray canopy of a large automatic spray booth incorporating a cyclone separator module, a filter module, a fan module, and a final filter section.
Figure 12:
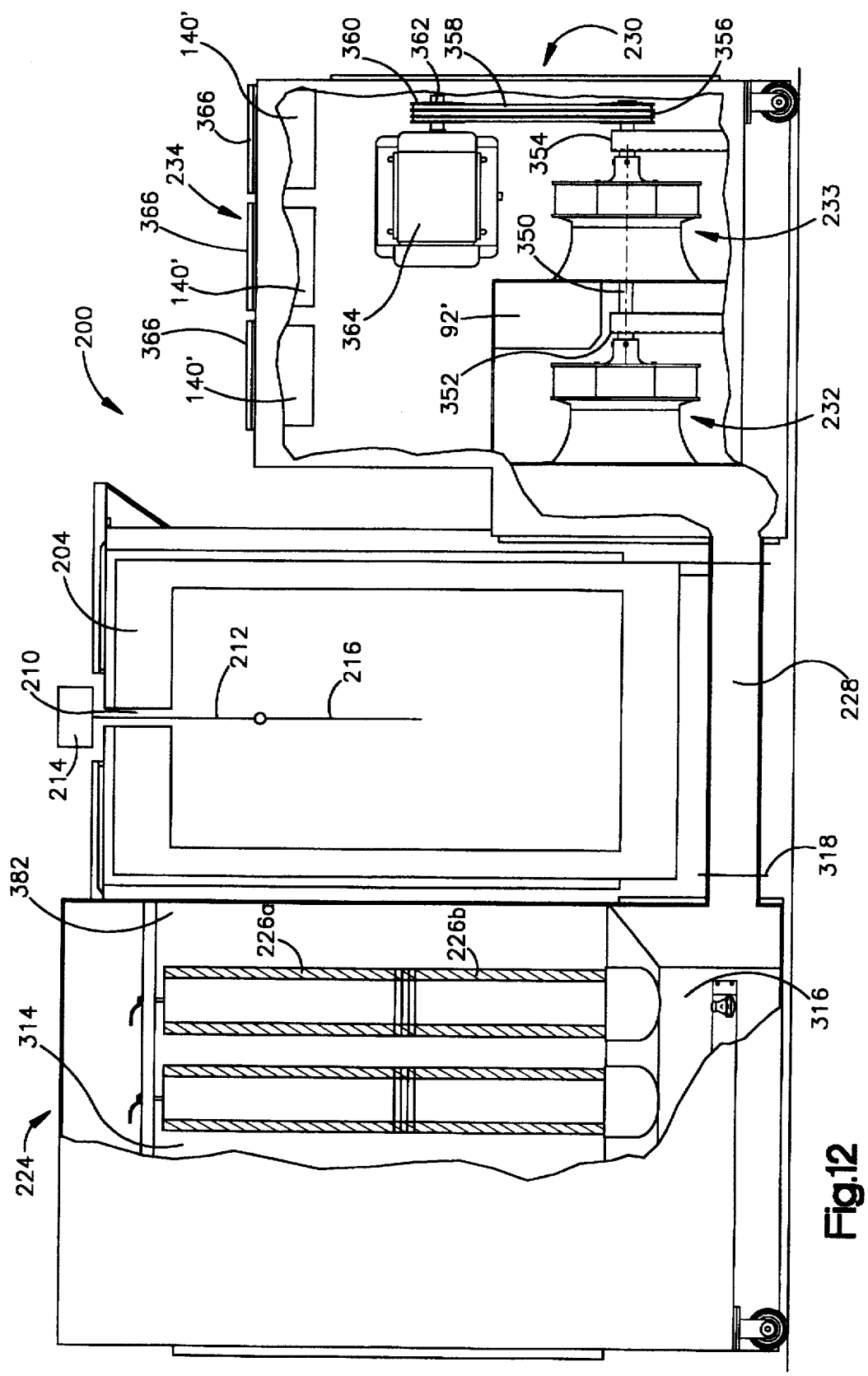
FIG. 12 is a side view taken along line 12—12 of FIG. 11 showing the filter module and the fan module located on opposite sides of the powder spray canopy.
Figure 13:
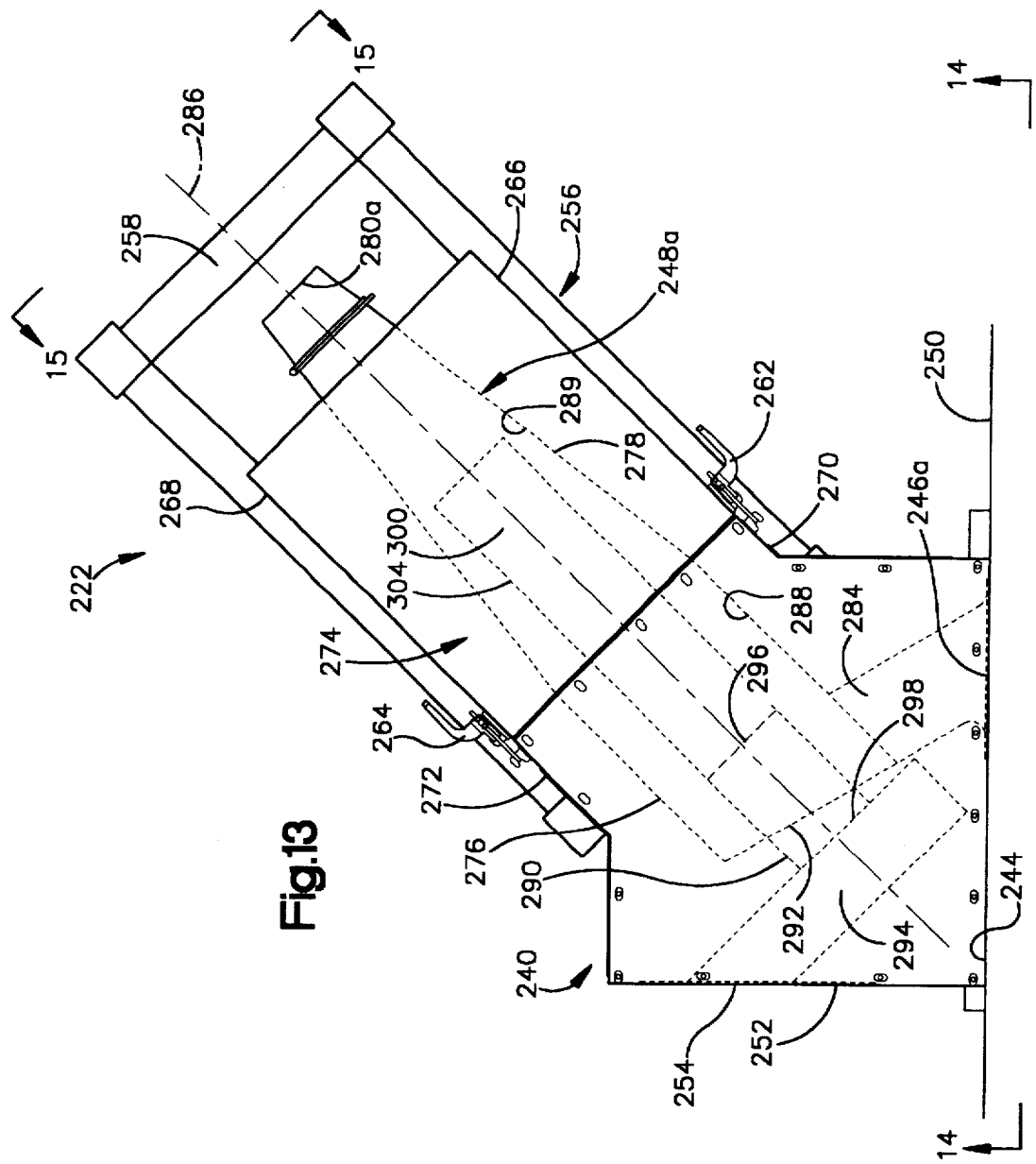
FIG. 13 is a plan view of the cyclone separator module shown in FIG. 11.
Figure 14:
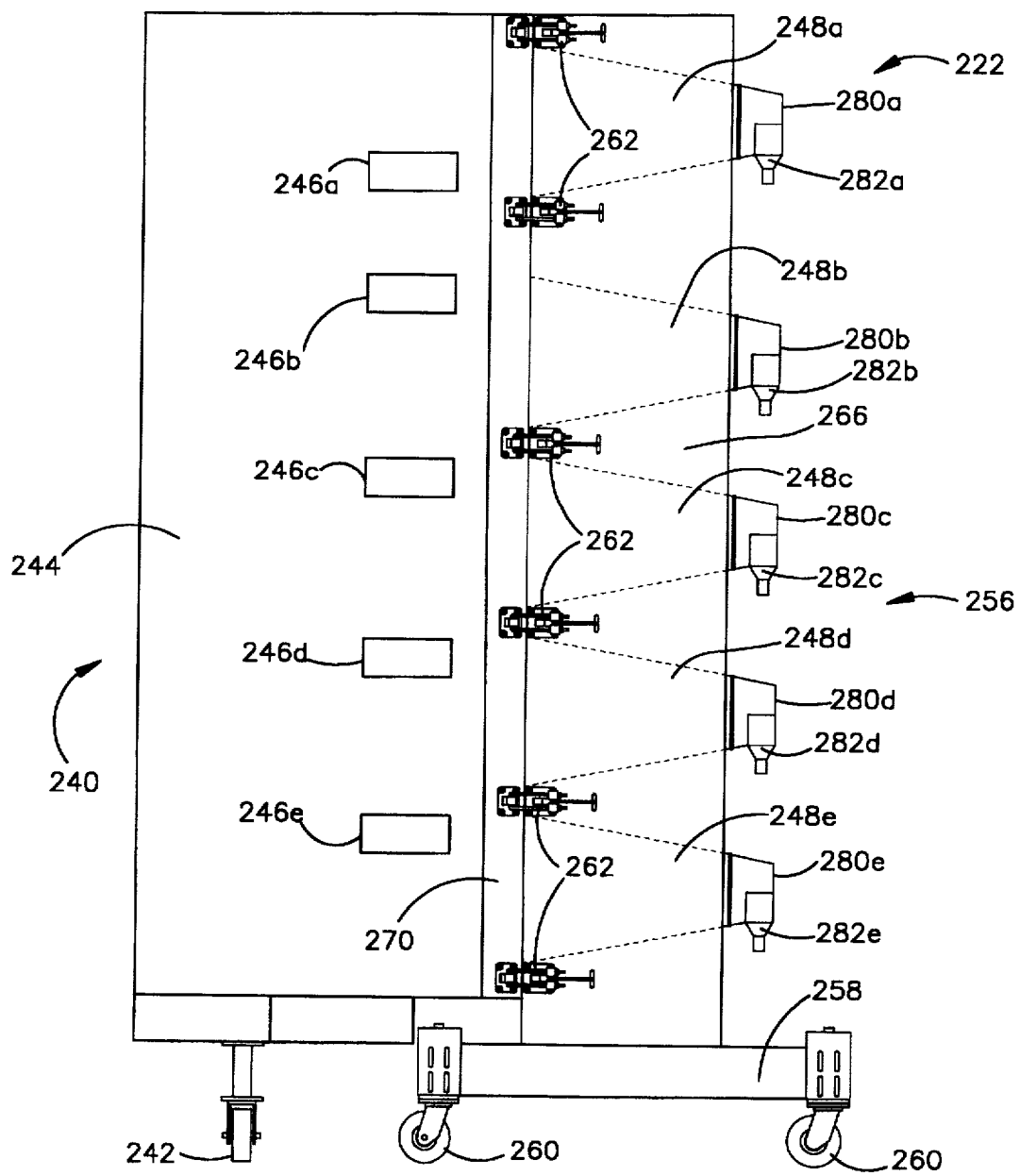
FIG. 14 is a side view of the cyclone separator module taken along line 14—14 of FIG. 13.
Figure 18:
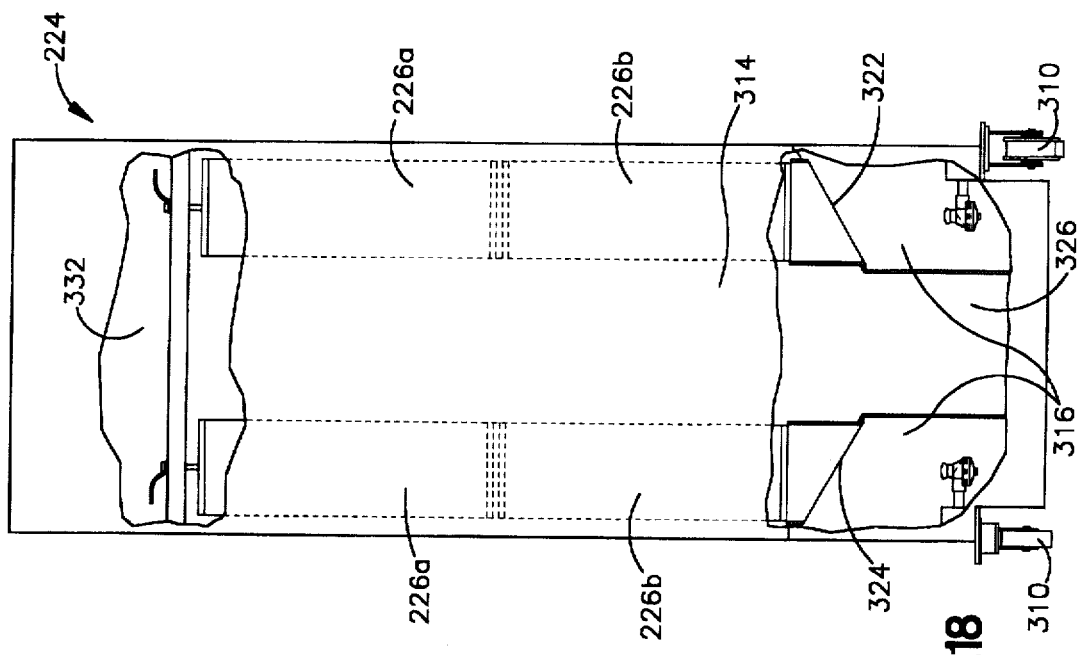
FIG. 18 is a side view of the filter module taken along line 18—18 of FIG. 17.
Figure 17:
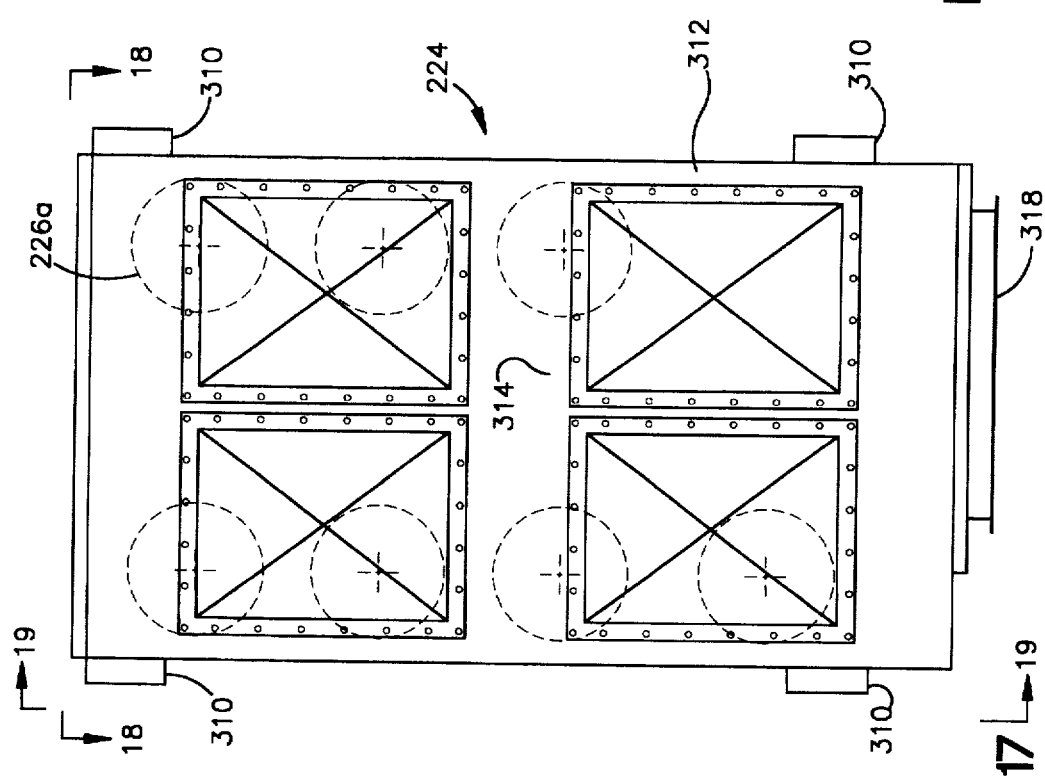
FIG. 17 is a plan view of the filter module shown in FIG. 11.
Figure 19:
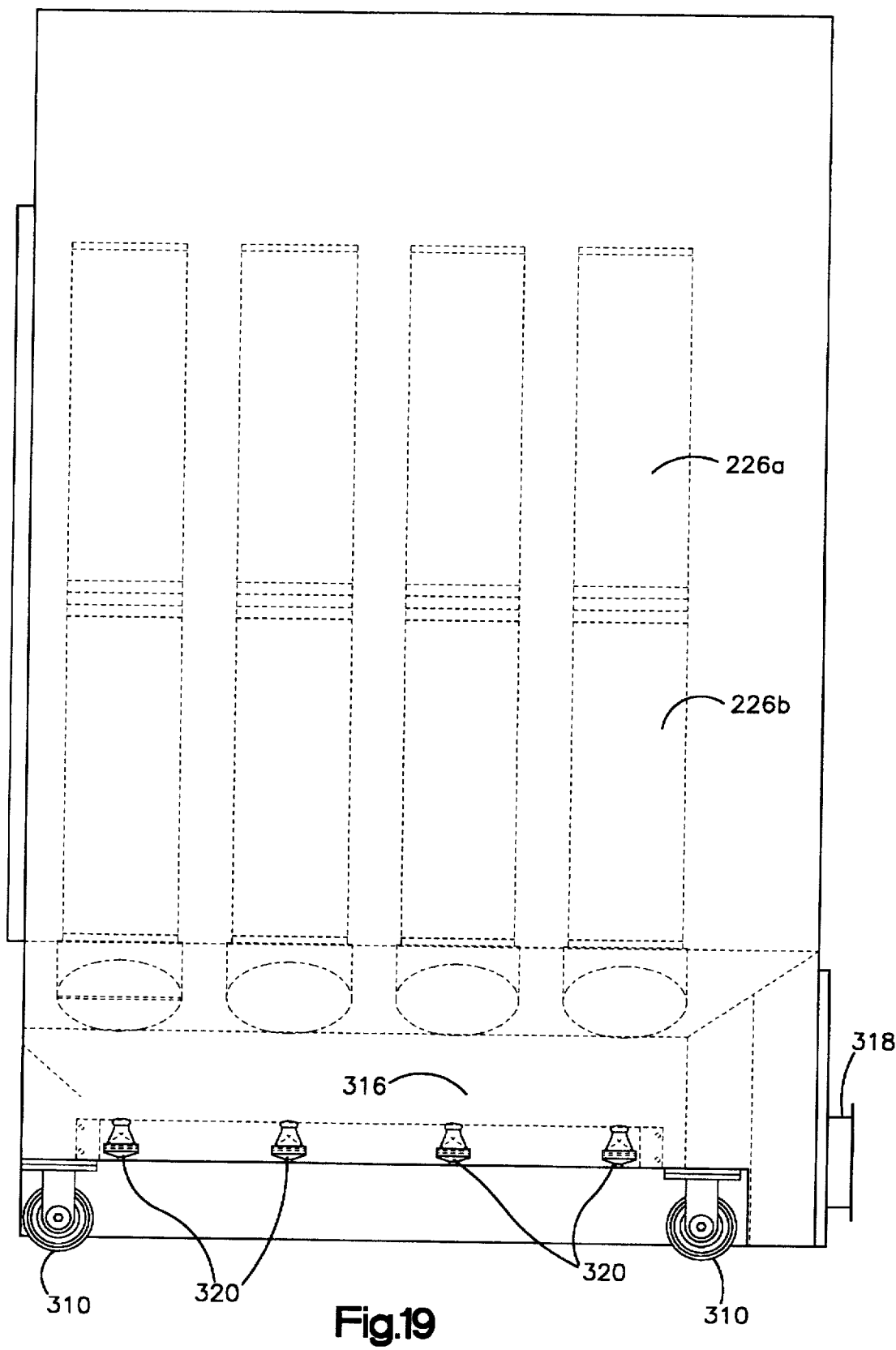
FIG. 19 is an end view of the filter module taken along line 19—19 of FIG. 17.

Referring to FIGS. 17 and 18, there is illustrated a filter module 224 having stacks of two filters 226a and 226b. The filter module 224 is secured to powder coating booth 202, as shown in FIGS. 11 and 12. The cyclone cleaned air enters the inlet air chamber 312 from the exhaust 254 and flows into the chamber 314 containing the stacked filters 226a,226b. While seven stacks of filters are illustrated, it is within the terms of the invention to use any number of filter stacks as desired. Note that the stack of filters in the lower right corner of FIG. 17 is missing because this is the location where the cyclone cleaned air enters chamber 312 through a series of holes (not shown) in wall 315 that are aligned with an equal number of outlets 254. The cyclone cleaned air is drawn through the filter stacks and into parallel exhaust chambers 316 below the stacks of filters and through an exhaust outlet 318 and into air transfer plenum 228 (see in FIG. 12). As best seen in FIG. 19, pulse valves 320 are disposed below each stacked pair of filters 226a,226b for cleaning the filters as is conventionally known in the prior art. When the pulse valves are operated, powder from the filters falls onto inclined surfaces 322 and 324 (See FIG. 18) and then slides into a collection chamber 326. The powder collected in chamber 326 will normally be a combination of small amounts of different colors of powder, and therefore, this powder will normally be discarded.

Fan Module

Figure 20:
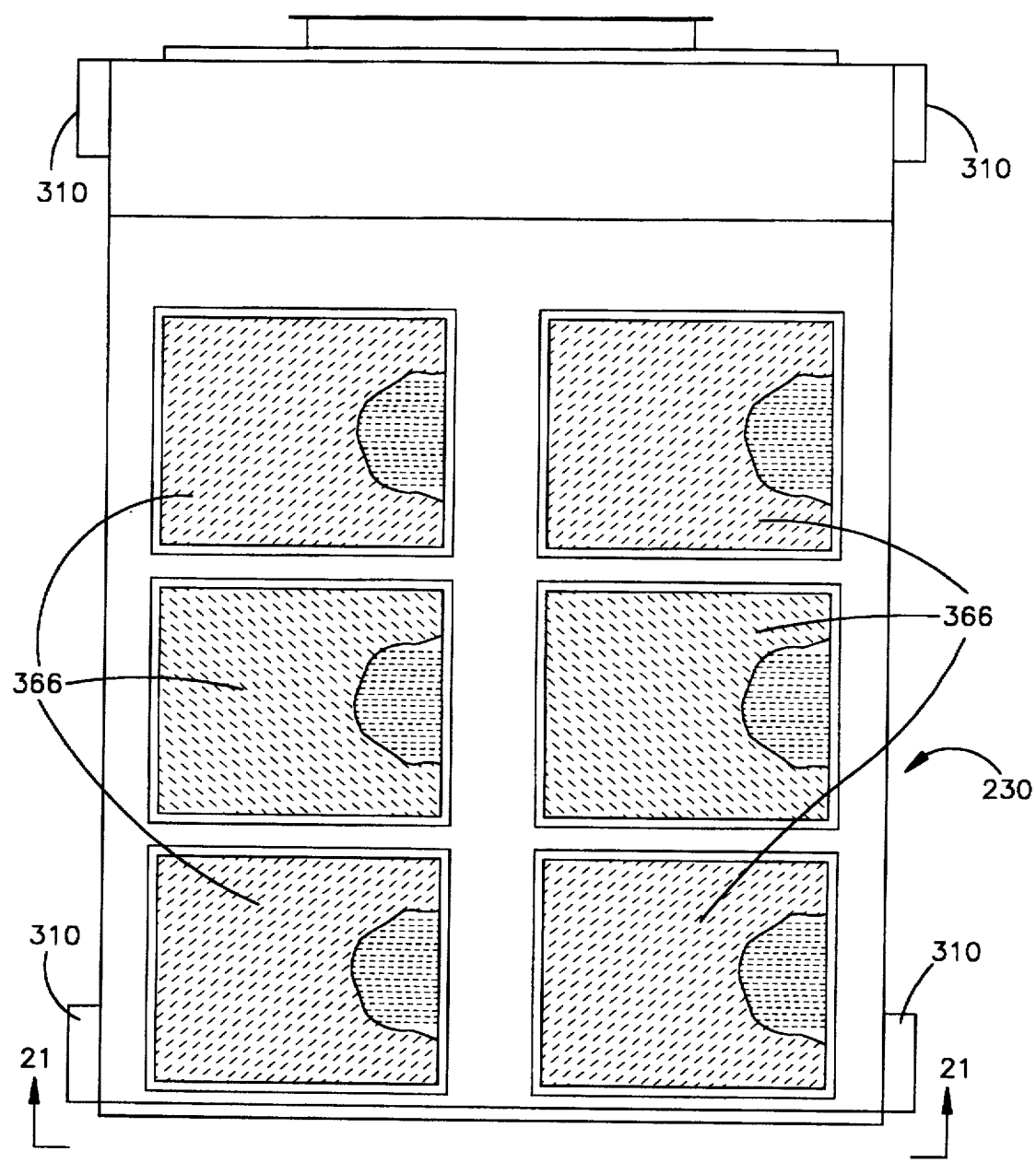
FIG. 20 is a plan view of the fan module shown in FIG. 11.
Figure 21:
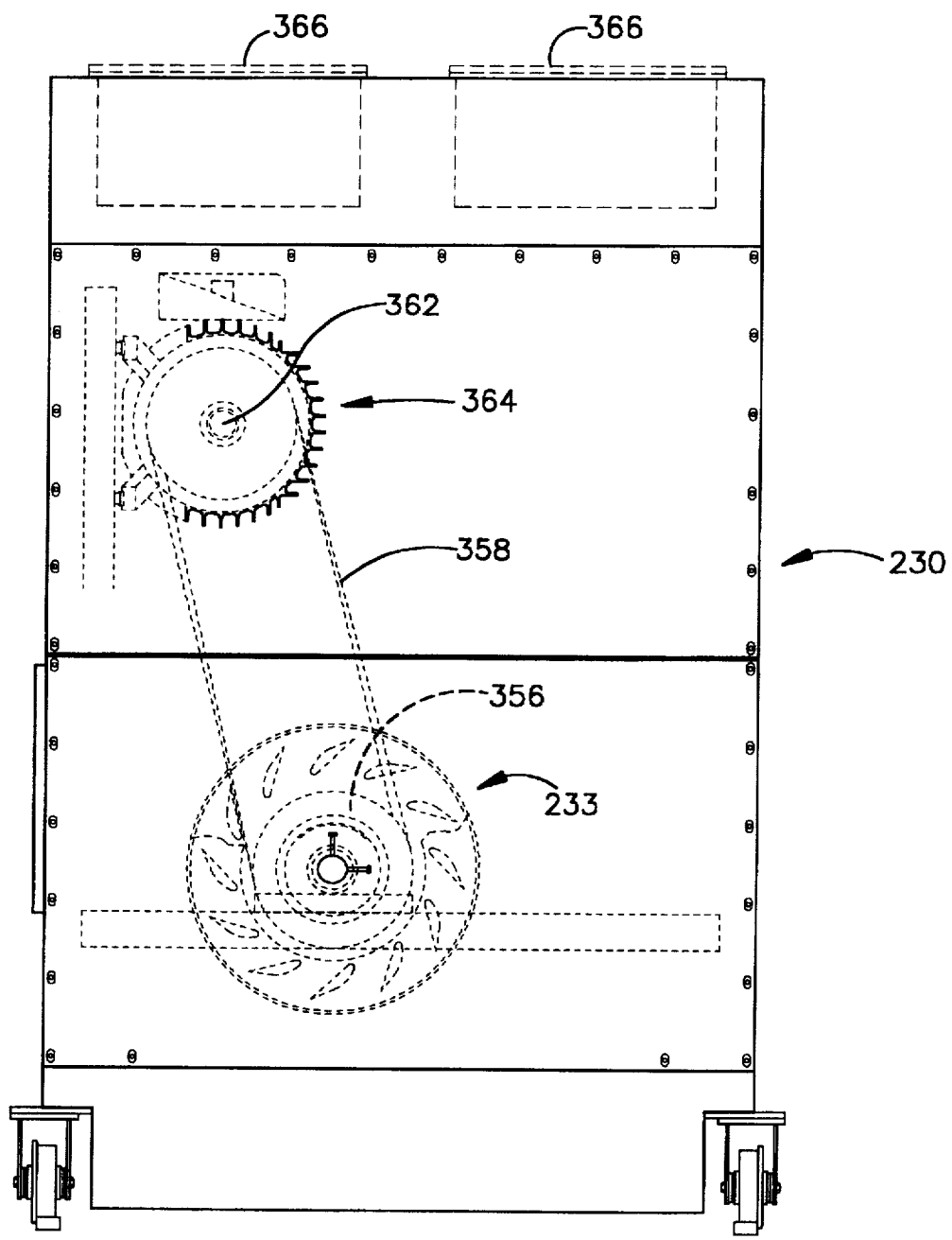
FIG. 21 is an end view of the fan module taken along line 21—21 of FIG. 20.

Fan module 230, as seen in FIGS. 12, 20 and 21, has two fan assemblies 232 and 233 that are mounted in series on a single shaft 350 that is mounted in bearing sleeves 352 and 354. As in the first embodiment, one end of shaft 350 has a pulley 356 secured thereto. A drive belt 358 is disposed about pulley 356 and a pulley 360 secured to a drive shaft 362 of a motor 364. The fan assemblies 232 and 233 are typically constructed of quiet, air foil wheels, substantially identical to those in fan assemblies 122 and 124, and are placed in series to reduce the noise level of the fans while still attaining the pressure needed for efficient system operation. As in the first embodiment, fan guides 92' are incorporated between the fan assemblies 232 and 233 to straighten the air flow from first fan assembly 232 into the second fan assembly 233 so that the second fan assembly can do the work on the air flow to increase the overall suction force on the cyclone separators 248a–248e. Throughout the specification, primed numbers represent structural elements which are substantially identical to structural elements represented by the same unprimed number.

Final Filter Section

The filtered air being exhausted from fan assembly 233 flows into the final filter section 234 which contains final filters 140'. As with the first embodiment, the final filters 140' are mounted so that they can easily be removed and replaced in final filter section 234. Access to the final filters is by removing filter clamp frames 366.

Operation of Second Embodiment

The operation of powder recovery system 200 is shown in FIG. 10. Overspray powder is removed from powder coating booth 202 as a stream of powder laden air and drawn into the cyclone separator module 222 due to the suction force created by fans 232,235. In module 222 the powder is separated from the cyclone cleaned air. The cyclone cleaned air then flows into a filter module 224 where any residual powder, normally finer powder, is removed. The filtered air is drawn through a fan module 230 and directed across a final filter section 234 from where the final filtered air is exhausted from powder recovery system 200 into the air surrounding the system. Since the system works in a manner similar to the system 10 described hereinbefore, a full description of the system is not included.

It is apparent that there has been provided in accordance with this invention apparatus and methods for recycling oversprayed powder collected from a powder coating booth with a cyclone recovery system incorporating serial fans between two filter sections that satisfy the objects, means and advantages set forth hereinbefore. According to the invention, powder is separated from a stream of powder laden air drawn from a manual powder coating booth with a cyclone recovery system, typically containing two cyclone separators for separating the powder from the air. The cyclone cleaned air is drawn through a prefilter section for further separating powder from the cyclone cleaned air. The prefilter cleaned air is then drawn through a fan section having serial fans and discharged through a final filter section for separating the prefilter cleaned air from any remaining powder and exhausting the final filter cleaned air to the air surrounding the cyclone recovery system. The invention also relates to an improved cyclone separator which incorporates a perforated thimble within the cyclone separation to reduce the pressure drop across the cyclone separator. In a second embodiment, a stream of powder laden air is drawn from an automatic powder spray booth with a cyclone recovery system typically incorporating horizontally disposed cyclone separators, each with a perforated thimble. The cyclone separators have a break away design which permits easy cleaning. The oversprayed powder recovered by the cyclones is discharged tangentially and recycled to the spray guns. The air discharged from the cyclones is filtered by a filter module having cartridge filters. The air then passes through a fan module, and a final filter.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A cyclone recovery system, said system comprising:
   a wheeled cyclone separator module containing a plurality of cyclone separators in a non-vertical orientation, said cyclone module having a powder inlet section and a powder outlet section detachably secured to each other;
   a filter module mounted to said powder outlet section of said wheeled cyclone separator module;
   a fan module connected to said filter module; and
   a filter section connected to said fan module.

2. The cyclone recovery system of claim 1 wherein each of said plurality of cyclone separators includes:
   a cyclone separator housing with a cylindrical portion attached to a frustoconical converging portion;
   a cyclone separator inlet;
   a tubular member concentrically disposed within said cylindrical portion; and
   a thimble constructed of a cylindrical wall mounted at one end to said tubular member and open at the opposite end.

3. The cyclone recovery system of claim 2 wherein said thimble has a plurality of openings extending through said cylindrical wall.

4. The cyclone recovery system of claim 3 wherein said cyclone separator inlet is disposed in a tangential orientation to said cyclone separator housing.

5. The cyclone recovery system of claim 3 wherein said cyclone separator housing has a powder outlet disposed in tangential orientation to said frustoconical converging portion.

6. The cyclone recovery system of claim 5 further including a pump connected to said powder outlet.

7. The cyclone recovery system of claim 1 wherein said plurality of cyclone separators are disposed generally horizontally with respect to each other.

8. The cyclone recovery system of claim 7 wherein said plurality of cyclone separators are arranged one above the other.

9. A cyclone separator comprising:
   a cyclone separator housing with a cylindrical portion and a frustoconical converging portion;
   a powder laden air inlet mounted in substantially tangential orientation to said cylindrical portion;
   a tubular member having a first end extending into said cylindrical portion and a second opposite end terminating outside of said cyclone separator housing; and a perforated thimble formed of a cylindrical wall with an inner surface free of inwardly facing protrusions, said cylindrical wall having a clean air outlet end secured to said first end of said tubular member within said separator housing and a clean air inlet end of said cylindrical wall closer to said frustoconical converging portion, said perforated thimble having a plurality of openings through said cylindrical wall permitting air transfer between an outer vortex of powder laden air flowing along an outer surface of said cylindrical wall and an inner vortex of clean air flowing along the inner surface of said cylindrical wall.

10. The cyclone recovery system of claim 9 wherein said frustoconical portion has a powder outlet disposed in substantially tangential orientation to said second frustoconical converging portion.

11. The cyclone recovery system of claim 10 further including a pump connected to said powder outlet.

12. The cyclone recovery system of claim 9 wherein said powder laden air inlet is in substantially tangential orientation to said cylindrical portion of said housing.

13. The cyclone recovery system of claim 9 wherein said frustoconical converging portion is removably mounted to said cylindrical portion.

14. The cyclone recovery system of claim 9 wherein said clean air inlet end of said thimble is disposed in said frustoconical converging portion.

15. The cyclone recovery system of claim 9 wherein said clean air inlet end of said thimble is disposed at the intersection of said cylindrical portion and said frustoconical converging portion.

16. The cyclone recovery system of claim 9 wherein the area of said clean air inlet of said thimble is less than or equal to the area between the outer surface of said cylindrical wall and the inner surface of said frustoconical converging portion at a location directly adjacent said clear air inlet end.

17. The process of recovering powder with a cyclone recovery system including the steps of:

providing a cyclone separator housing with a cylindrical portion, a frustoconical converging portion mounted to said cylindrical portion, a tubular member having a first end extending into said cylindrical portion and mounted to one end of a perforated thimble, said perforated thimble formed of a cylindrical wall with a plurality of openings therethrough and having an open opposite end disposed in said cyclone separator housing;

directing an outer vortex of powder laden air spiraling in a first direction between said tubular member, said perforated thimble and said cyclone separator housing for separating said powder laden air into powder and cyclone cleaned air;

directing said cyclone cleaned air into the open opposite end of the perforated thimble so that an inner vortex of said cyclone cleaned air is spiraling in a second direction opposite to said first direction through said perforated thimble and then into said tubular member; and establishing the location of the boundary between said outer vortex of powder laden air spiraling in said first direction and said inner vortex of cyclone cleaned air spiraling in said second direction with said plurality of openings through said cylindrical wall.

18. The process of claim 17 further including the step of spiraling said cyclone cleaned air through said perforated thimble with said cylindrical wall having an inner surface free of inwardly facing protrusions.

19. The process of claim 17 further including the step of discharging powder from said cyclone separator with a pump.

20. A cyclone recovery system, said system comprising:

a cyclone module containing at least one cyclone separator for extracting powder from a stream of powder laden air, said at least one cyclone separator having a cyclone inlet to draw said stream of powder laden air into said cyclone separator, a cyclone powder outlet through which powder is removed from said cyclone separator, and a cyclone air outlet through which cyclone cleaned air is exhausted from said cyclone separator;

a final filter section having at least one final filter element for separating said cyclone cleaned air from remaining powder and exhausting final filter cleaned air; and a fan section between said cyclone module and said final filter section, said fan section having at least two serially arranged fan assemblies to direct said cyclone cleaned air from said cyclone module, through said fan section, and through said final filter section.

21. The cyclone recovery system of claim 20 wherein said at least two serially arranged fan assemblies are mounted on a single shaft rotated by a motor.

22. The cyclone recovery system of claim 20 further including a plurality of fan inlet guide vanes to straighten the air flow between said at least two serially arranged fan assemblies.

23. The cyclone recovery system of claim 20 wherein each of said at least two serially arranged fan assemblies is constructed with air foil-type wheels.

24. The cyclone recovery system of claim 20 further including a prefilter section between said cyclone module and said fan section, said prefilter section having at least one prefilter element.

25. A cyclone recovery system, comprising:

a cyclone module containing at least one substantially non-vertically disposed cyclone separator for extracting powder from a stream of powder laden air, said at least one cyclone separator having a cyclone inlet through which said stream of powder laden air is drawn into said cyclone separator, a cyclone powder outlet through which powder is removed from said at least one cyclone separator, and a cyclone air outlet through which cyclone cleaned air is exhausted from said at least one cyclone separator; and a pump attached to said cyclone powder outlet.

26. The cyclone recovery system of claim 25 further including a plurality of substantially horizontally disposed cyclone separators.

27. The cyclone recovery system of claim 26 wherein said cyclone separators are arranged one above the other.

28. The cyclone recovery system of claim 25 wherein said cyclone powder outlet is mounted in a tangential orientation to said at least one cyclone separator.

29. The cyclone recovery system of claim 25 wherein said at least one cyclone separator includes:

a cyclone separator housing having a cylindrical portion and a frustoconical converging portion terminating in a reduced end portion;

a tubular member concentrically disposed within said cylindrical portion of said separator housing, said tubular member having one end extending into said cylindrical portion of said separator housing and a second opposite end terminating outside of said separator housing to form a cyclone cleaned air outlet; and a thimble disposed in said separator housing and mounted at a first end to said one end of said tubular member, said thimble having a second open, opposite end forming a cyclone cleaned air inlet.

30. The cyclone recovery system of claim 29 wherein said thimble is formed of a cylindrical perforated wall with a plurality of openings through the cylindrical wall.

31. The cyclone recovery system of claim 25 wherein said cyclone module includes:

a powder laden air inlet section secured to a powder coating booth; and a powder outlet section mounted on wheels for rolling into and out of engagement with said powder laden air inlet section.

32. The cyclone recovery system of claim 31 wherein said cyclone module has a plurality of cyclone separators arranged one above the other so that corresponding forward sections of said cyclone separators are arranged one above the other on a frame which is mounted on wheels for rolling into and out of engagement with the corresponding rear sections of said cyclone separators.

33. The cyclone recovery system of claim 29 wherein said reduced end portion has an outlet oriented tangentially to said frustoconical converging portion.

34. The cyclone recovery system of claim 33 wherein said thimble extends into said frustoconical converging portion.

35. A powder coating system comprising:

a booth, said booth having at least one powder spray gun opening, at least one booth exhaust opening for oversprayed powder coating material conveyed in a stream of powder laden air, and entrance and exit openings for articles to be conveyed through said booth to be powder coated;

a cyclone module including at least one substantially non-vertically disposed cyclone separator for extracting powder from the stream of powder laden air, said at least one cyclone separator including a cyclone separator housing having a cylindrical portion and a frustoconical converging portion terminating at a cyclone powder outlet mounted in a substantially tangential orientation to said cyclone separator through which powder is removed from said cyclone separator, a cyclone inlet disposed in tangential relation to said cylindrical portion and through which said stream of powder laden air is drawn through said booth exhaust opening into said cyclone separator, and a cyclone air outlet through which cyclone cleaned air is exhausted from said cyclone separator; and a pump attached to said cyclone powder outlet.

36. The powder coating system of claim 35 further including a perforated tubular member disposed within said cylindrical portion of said separator housing, said perforated tubular member having one end extending into said cylindrical portion of said separator housing and a second opposite end terminating outside of said separator housing to form the cyclone air outlet.

37. The powder coating system of claim 35 further including a plurality of substantially horizontally disposed cyclone separators.

38. The powder coating system of claim 37 wherein said plurality of cyclone separators are arranged one above the other.

39. The powder coating system of claim 35 wherein said cyclone module includes:

a powder laden air inlet section secured to the booth; and a powder outlet section mounted on wheels for rolling into and out of engagement with said powder laden air inlet section.

40. The powder coating system of claim 39 wherein said cyclone module has a plurality of cyclone separators arranged one above the other so that corresponding forward sections of said cyclone separators are arranged one above the other on a frame which is mounted on wheels for rolling into and out of engagement with corresponding rear sections of said cyclone separators.

41. A process for recovering oversprayed powder coating material from a powder coating operation in a powder coating booth with a cyclone recovery system, including the steps of:

transporting articles to be powder coated into the powder coating booth;

spraying powder coating material toward the articles with some powder coating material adhering to the articles and some powder coating materials not adhering to the articles and forming oversprayed powder;

drawing oversprayed powder out of the powder coating booth as a stream of powder laden air and into the cyclone recovery system;

extracting powder from the stream of powder laden air, said step of extracting powder from the stream of powder laden air including the steps of:

drawing said stream of powder laden air through a cyclone module containing at least one substantially horizontally disposed cyclone separator for removing powder and discharging powder separated from said stream of powder laden air through a tangential powder outlet of said cyclone separator and exhausting cyclone cleaned air through a cyclone air outlet of said at least one cyclone separator; and separating residual powder from said cyclone cleaned air with a filter module containing a plurality of filter cartridges and exhausting filter cartridge cleaned air.

42. The process of claim 41 wherein said step of discharging powder separated from said stream of powder laden air through a tangential powder outlet includes pumping said powder from said tangential powder outlet by a pump attached to said cyclone powder outlet.

* * * * *